(12) United States Patent
Haag

(10) Patent No.: US 6,391,192 B1
(45) Date of Patent: May 21, 2002

(54) APPARATUS FOR TREATING BIOLOGICAL SLUDGE

(75) Inventor: Roger Haag, Suttons Bay, MI (US)

(73) Assignee: HTI, Inc., Suttons Bay, MI (US)

( * ) Notice: Subject to any disclaimer, the term of this patent is extended or adjusted under 35 U.S.C. 154(b) by 15 days.

(21) Appl. No.: 09/616,861

(22) Filed: Jul. 14, 2000

Related U.S. Application Data

(60) Provisional application No. 60/143,802, filed on Jul. 14, 1999.

(51) Int. Cl.[7] ................................................. C02F 11/14
(52) U.S. Cl. ........................ 210/96.1; 210/101; 210/104; 210/143; 210/192; 210/198.1; 210/205; 222/61; 137/572; 422/106; 422/162; 423/640
(58) Field of Search ................................ 210/96.1, 101, 210/104, 143, 198.1, 205, 744, 743, 192; 222/61; 137/572; 422/162, 106; 423/640

(56) References Cited

U.S. PATENT DOCUMENTS

| | | | |
|---|---|---|---|
| 1,956,420 A | | 4/1934 | Gleason et al. |
| 2,129,267 A | | 9/1938 | Fischer |
| 4,509,696 A | * | 4/1985 | Donaldson .................... 241/15 |
| 4,651,897 A | | 3/1987 | Johnson |
| 4,773,834 A | | 9/1988 | Saruwatari |
| 4,781,842 A | | 11/1988 | Nicholson |
| 4,852,269 A | | 8/1989 | Glorioso |
| 4,902,431 A | | 2/1990 | Nicholson et al. |
| 5,013,458 A | | 5/1991 | Christy, Sr. et al. |
| 5,014,211 A | * | 5/1991 | Turner et al. ................ 364/478 |
| 5,186,840 A | | 2/1993 | Christy et al. |
| 5,229,011 A | | 7/1993 | Christy, Sr. et al. |
| 5,277,491 A | * | 1/1994 | Burnett et al. ................. 366/51 |
| 5,378,374 A | * | 1/1995 | Anderson .................... 210/743 |
| 5,474,432 A | | 12/1995 | Hulley et al. |
| 5,564,595 A | * | 10/1996 | Minissian ..................... 222/59 |
| 5,603,842 A | | 2/1997 | Whitaker et al. |
| 5,679,262 A | | 10/1997 | Girovich et al. |
| 5,681,481 A | | 10/1997 | Christy et al. |
| 5,716,518 A | | 2/1998 | Whitaker et al. |
| 5,746,983 A | * | 5/1998 | Stephansen ................. 422/162 |
| 5,759,019 A | | 6/1998 | Wood et al. |
| 5,779,460 A | | 7/1998 | Marz |
| 5,851,404 A | | 12/1998 | Christy et al. |
| 5,853,450 A | | 12/1998 | Burnham et al. |
| 5,960,810 A | * | 10/1999 | Douglas ....................... 137/14 |

\* cited by examiner

*Primary Examiner*—Peter A. Hruskoci
(74) *Attorney, Agent, or Firm*—Ian C. McLeod

(57) ABSTRACT

An automated apparatus for introducing a mixed liquid base (lime) in a first container or tank (106, 106A) into a biological sludge in a second container (110, 110A and 110B) is described. The second container is used to house the sludge for a short period of time (2 to 12 hours) and then the liquid sludge is sent to a storage tank (112) for a longer period of time (6 months). The system (100) enables flushing of the lime supply conduits (108, 108A and 108B) with water to prevent clogging. The treated sludge is applied to soil as a fertilizer.

6 Claims, 34 Drawing Sheets

FIG. 20

APPARATUS FOR TREATING BIOLOGICAL SLUDGE

CROSS-REFERENCE TO RELATED APPLICATIONS

This application claims the benefit of U.S. Provisional Application(s) No(s).: 60/143,802 filing date Jul. 14, 1999.

BACKGROUND OF THE INVENTION (1) Field of the Invention

The present invention relates to an automated apparatus enabling control of treatment of biological (sewage) sludge with a liquid base, such as lime, to render the sludge microbially inactive. In particular, the present invention relates to an apparatus which provides for flushing maintenance of the conduits supplying the lime and/or sludge to a holding tank.

(2) Description of Related Art

The general state of the art is set forth in U.S. Pat. No. 1,956,420 to Gleason et al, 2,129,267 to Fischer. U.S. Pat. Nos. 4,781,842 and 4,902,431 to Nicholson et al (which contain an extensive discussion of U.S. regulations for sludge treatment); U.S. Pat. No. 4,852,269 to Glorioso, U.S. Pat. Nos. 5,013,458, 5,186,840, 5,229,011 and 5,851,404 to Christy et al, U.S. Pat. Nos. 5,603,842, 5,716,518 to Whitaker et al, U.S. Pat. No. 5,679,262 to Girovich et al, U.S. Pat. No. 5,681,481 to Christy et al and U.S. Pat. No. 5,853,450 to Burnham et al.

The goal of these processes is to produce a Class A treated sludge (formerly PFRP) according to U.S. Environmental Protection Agency Rules. However, none of the prior art addresses the difficulties in maintaining such systems so that they perform routinely to these standards.

OBJECTS

It is therefore an object of the present invention to provide an automated system or apparatus and method which continuously maintains the apparatus for the base treatment of sludge. In particular, it is an object of the present invention to provide for automated flushing of conduits which deliver sludge and other bases to holding tanks for treatment of the sludge. It is also an object of the present invention to provide an apparatus and method for the use thereof which is relatively inexpensive and reliable. These and other objects will become increasingly apparent by reference to the following description and the drawings.

SUMMARY OF THE INVENTION

The present invention relates to an apparatus for introducing a mixed liquid base in a first container into a biological sludge in a second container in fluid connection with the first container which comprises: a first conduit which extends into a bottom portion of the first container for removing the liquid base from the first container; pump means connected to the first conduit for pumping the liquid base from the first container; a second conduit connected to the first conduit through the pump for introducing the liquid base and sludge into the second container; flush conduits connected to the first and second conduits which can be connected to a source of water to intermittently flush the first and second conduits and the pump; electric valve means in the first conduit and second conduit and flush conduits for allowing the liquid base to flow from the first container to the second container and alternately to allow flushing of the first and second conduits and pump to remove retained amounts of the liquid base; and electric control means for controlling the valve means.

The present invention also relates to an apparatus for introducing a mixed liquid base in a first closed container into a biological sludge in a second closed container in fluid connection with the first container to achieve a pH of 12 or above in the sludge for two (2) hours or more which comprises: a first conduit which extends into a bottom portion of the first closed container for removing the liquid base from the first container; pump means connected to the first conduit for pumping the liquid base from the first container; a second conduit connected to the first conduit through the pump for introducing the liquid base separately into the second container; a third conduit connected to the second conduit for conveying the liquid base into a fourth conduit containing the sludge which is mixed with the liquid base and then fed into the second container; fifth, sixth and seventh conduits for providing water to the second conduit for flushing the second, third and fourth conduits and the pump respectively; electric valve means in the first, second, third, fourth, fifth and sixth conduits; and electric control means connected to the valve means, wherein the valve means allow pumping of the liquid base by the pump means from the first container through the first, second, third and fourth conduits directly into the second container to be mixed with the sludge and allow intermittent flushing of the first, second, third and fourth conduits with water to prevent caking of retained amounts of the base in the first to fourth conduits.

Further the present invention relates to a lime injector apparatus for introducing a mixed liquid lime from a first container into a biological sludge in a second closed container in fluid connection with the first container to provide a pH of 12 or above in the sludge which comprises: a first closed container for holding the liquid lime prior to introduction into the sludge for two (2) hours or more in the second closed container; a first conduit for removal of liquid lime from the first closed container; a progressive cavity pump connected to the first conduit outside of the first closed container for pumping the liquid lime into the second closed container; first valve means in the first conduit for directing the liquid lime through the pump; second valve means in a second conduit leading to the second closed container from the first conduit; minimum and maximum level sensing means in the first closed container; flush lines leading to the first and second conduits for introducing the water into the first and second conduits and pump to intermittently flush retained amounts of the liquid lime; and control means for remotely selectively operating the pump, the first valve and the second valve, wherein the liquid level in the first container is periodically at between the maximum level in the first container and refilled at the minimum level and wherein periodically the liquid lime is introduced into the second container.

Still further, the present invention relates to a method for providing a base in a biological sludge which comprises: providing an apparatus for including the base from a first container into the sludge in a second container which comprises: a first conduit which extends into a bottom portion of the first container for removing the liquid base from the first container; pump means connected to the first conduit for pumping the liquid base from the first container; a second conduit connected to the first conduit through the pump for introducing the liquid base and sludge into the second container; flush conduits connected to the first and second conduits which can be connected to a source of water to intermittently flush the first and second conduits and the pump; electric valve means in the first conduit and second conduit and flush conduits for allowing the liquid base to flow from the first container to the second container and alternately to allow flushing of the first and second conduits and pump to remove retained amounts of the liquid base; and electric control means for controlling the valve means; intermittently introducing the lime into the sludge in the second container and holding the sludge; and intermittently flushing the first and second conduits and the pump to remove the base.

LEGEND

Figure 1:
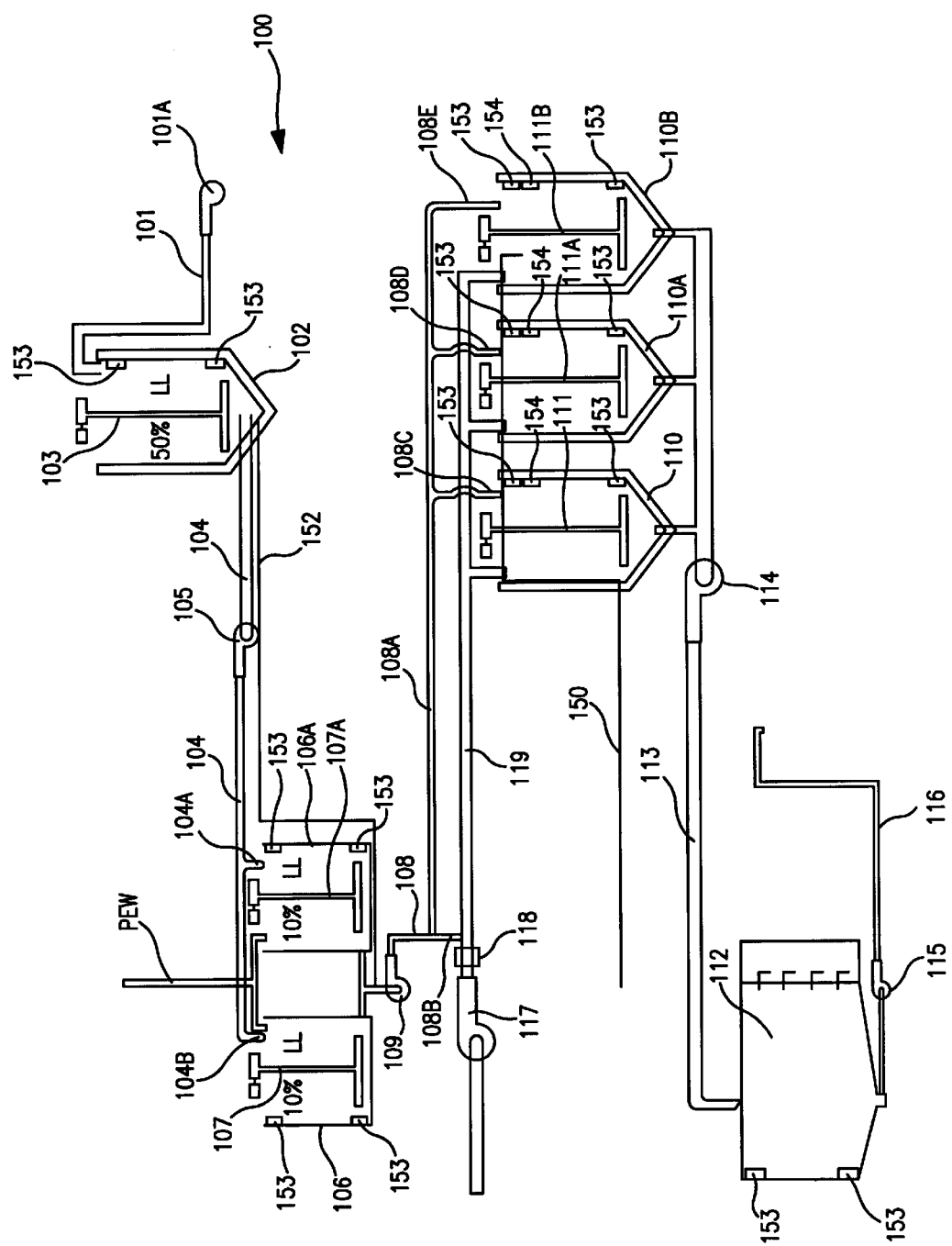
FIG. 1 is a schematic drawing showing the system 100 of the present invention.
Figure 2:
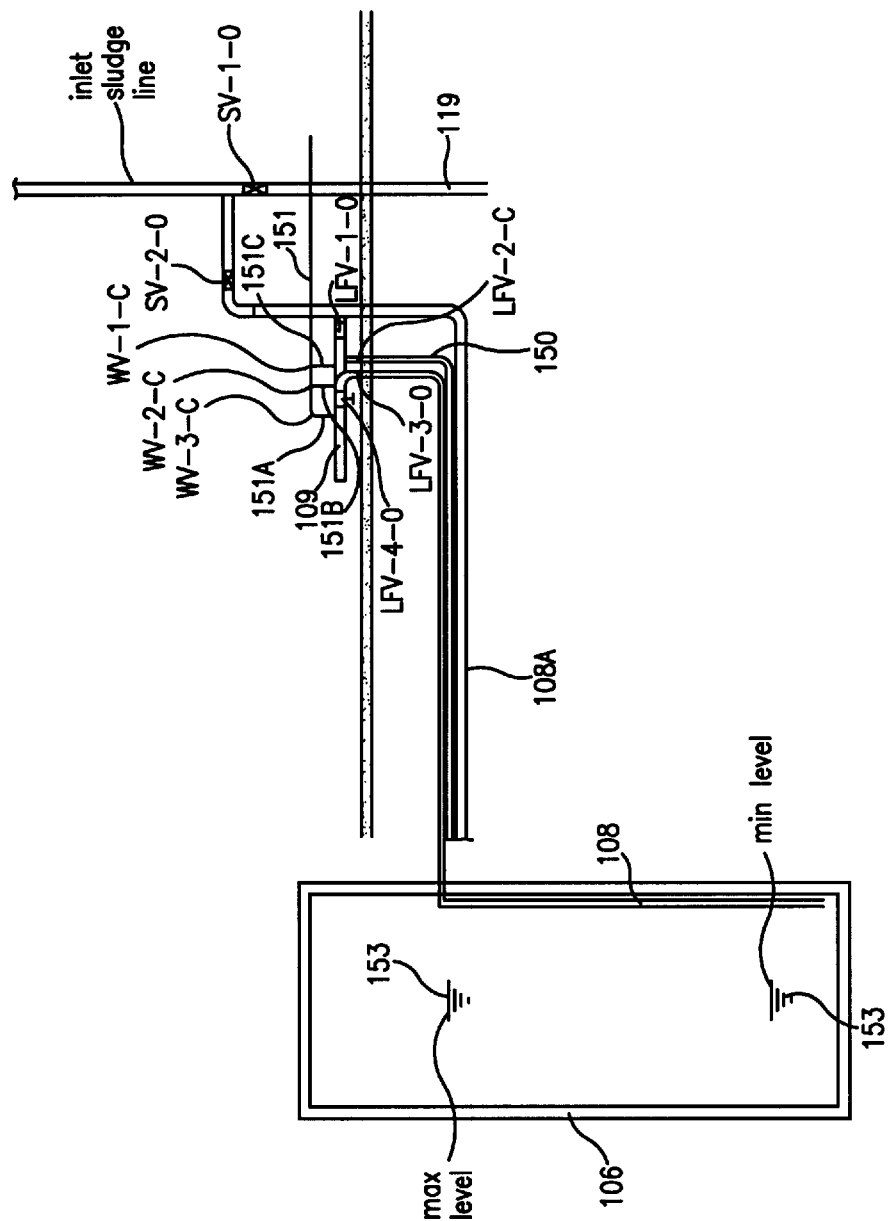
FIGS. 2 to 6 are schematic drawings showing the operation of various valves. The legends for the valves are as follows.

Example:
SV-1-0 Sludge Valve No. 1 Open
SV-l-C Sludge Valve No. 1 Closed
LFV-2-C Lime Feed Valve No. 2 Closed
LFV-2-0 Lime Feed Valve No. 2 Open
WV-2-C Water Valve No. 2 Closed
WV-2-0 Water Valve No. 2 Open FIG. 2 is a schematic view showing normal operation for pumping sludge to the day tank 110 (FIG. 1).

Figure 3:
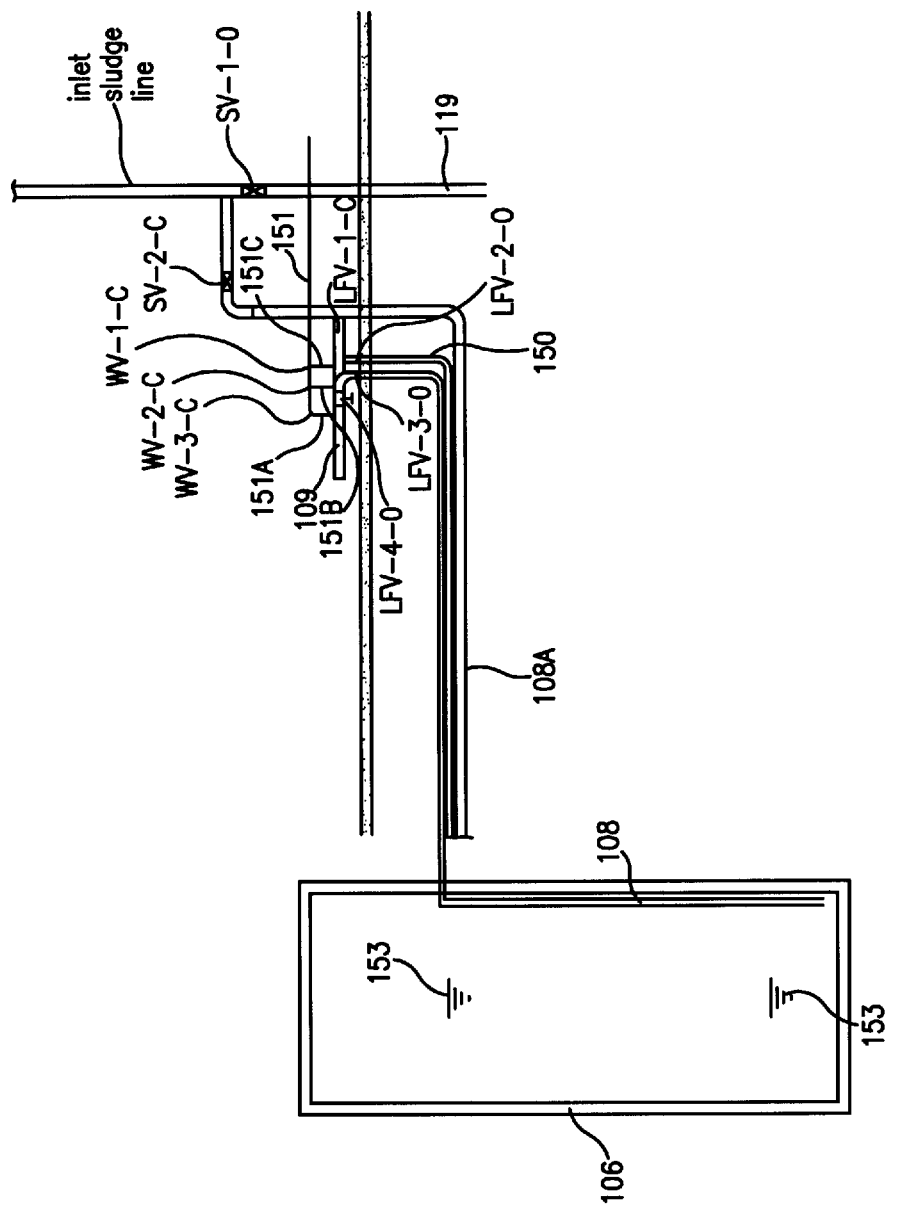

FIG. 3 is a schematic view showing the addition of lime by a spike line 150.

Figure 4:
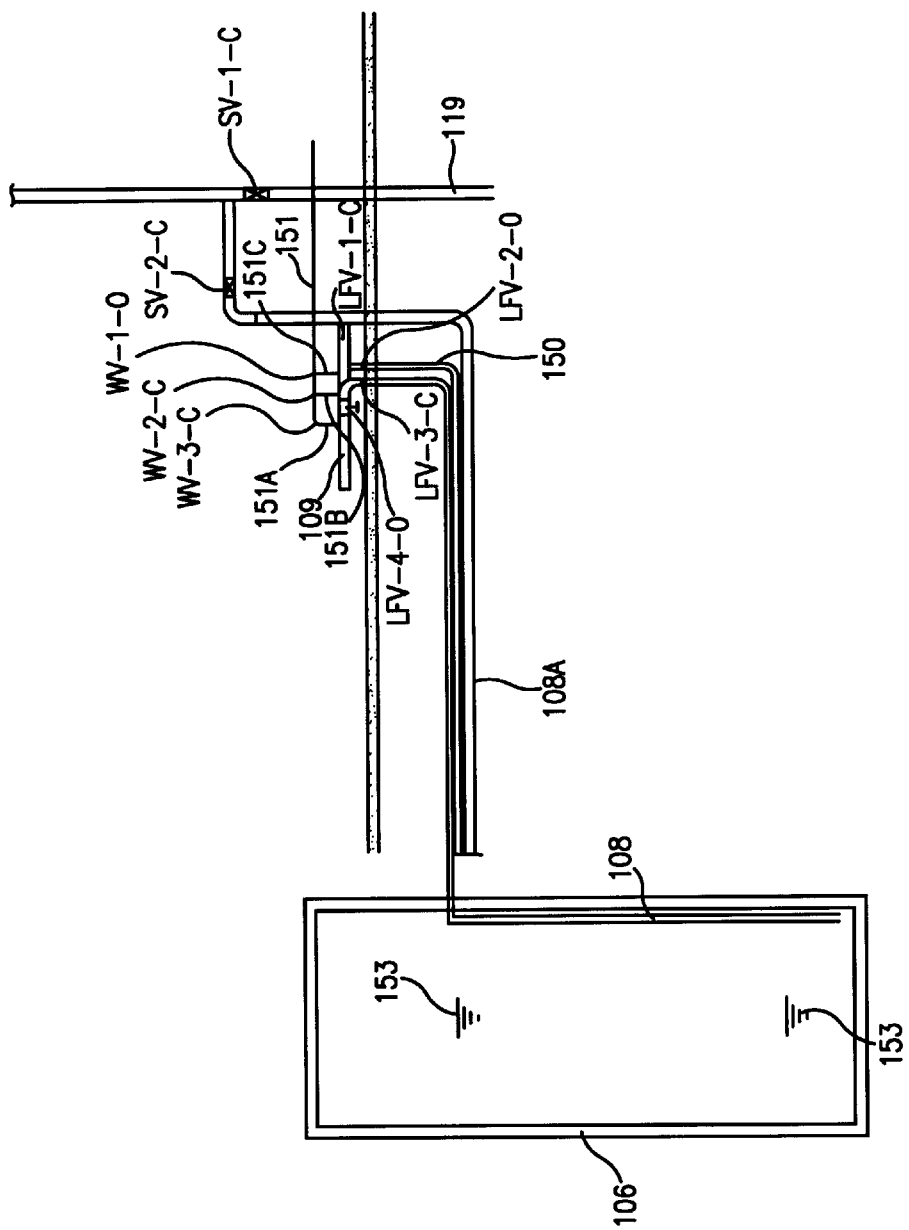

FIG. 4 is a schematic view showing the flushing of the spike line 150 by water line 151 with branches 151A, 151B and 151C.

Figure 5:
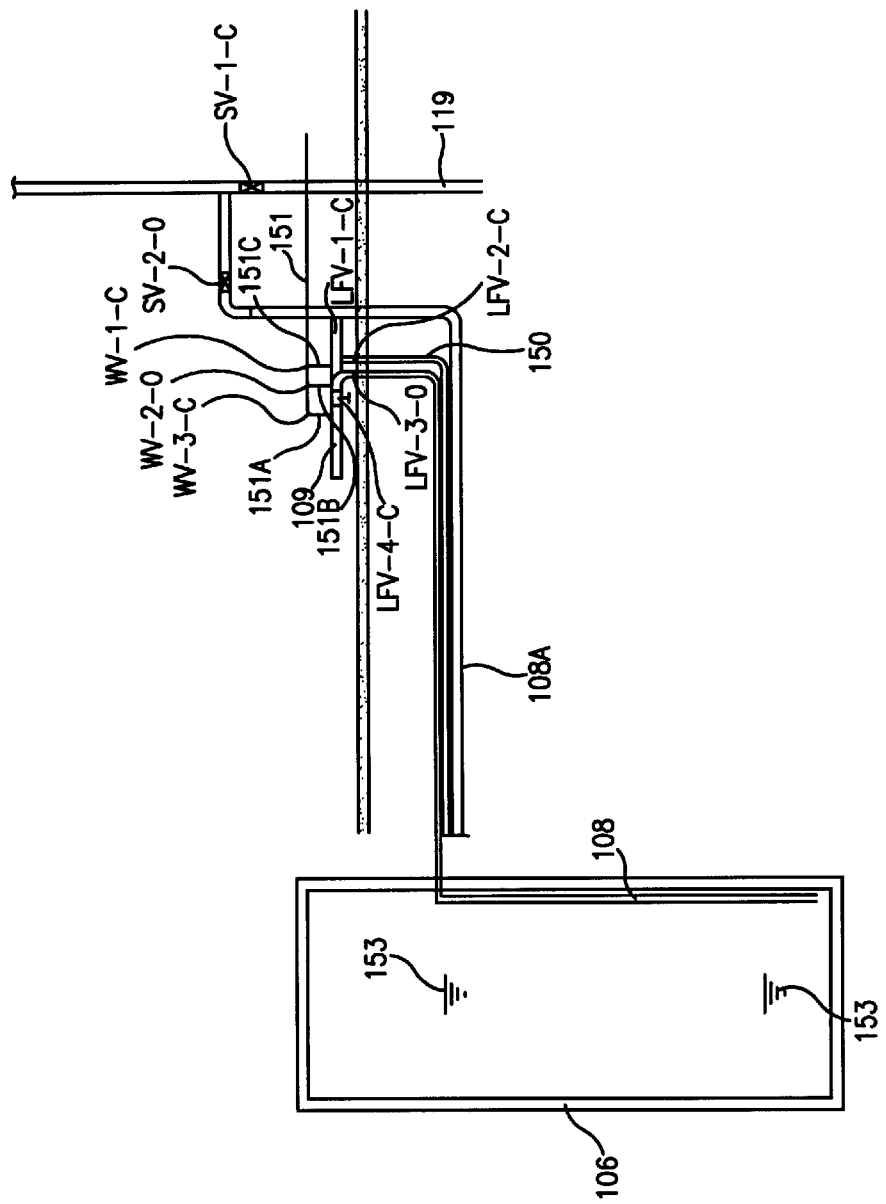

FIG. 5 is a schematic view showing flushing of the line 108.

Figure 6:
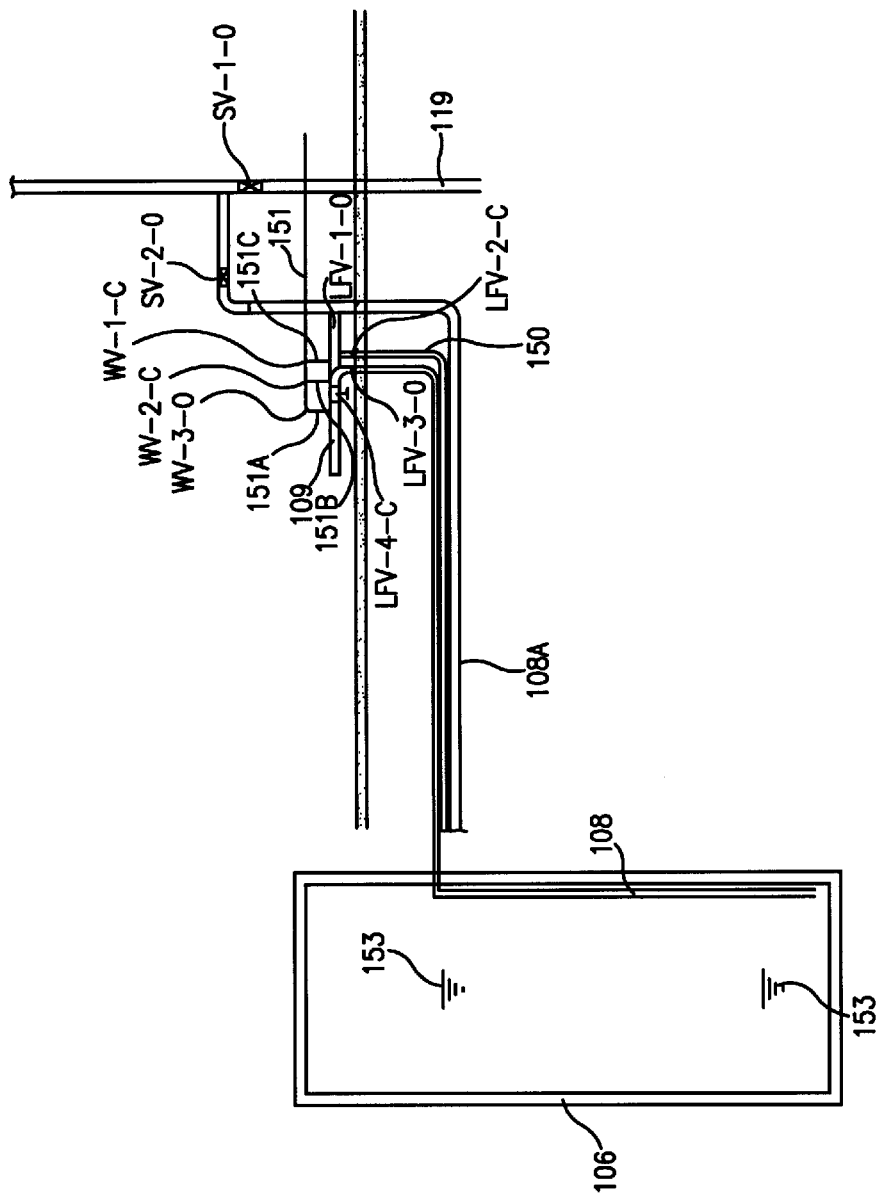

FIG. 6 is a schematic view showing flushing of the pump 109.

Figure 7:
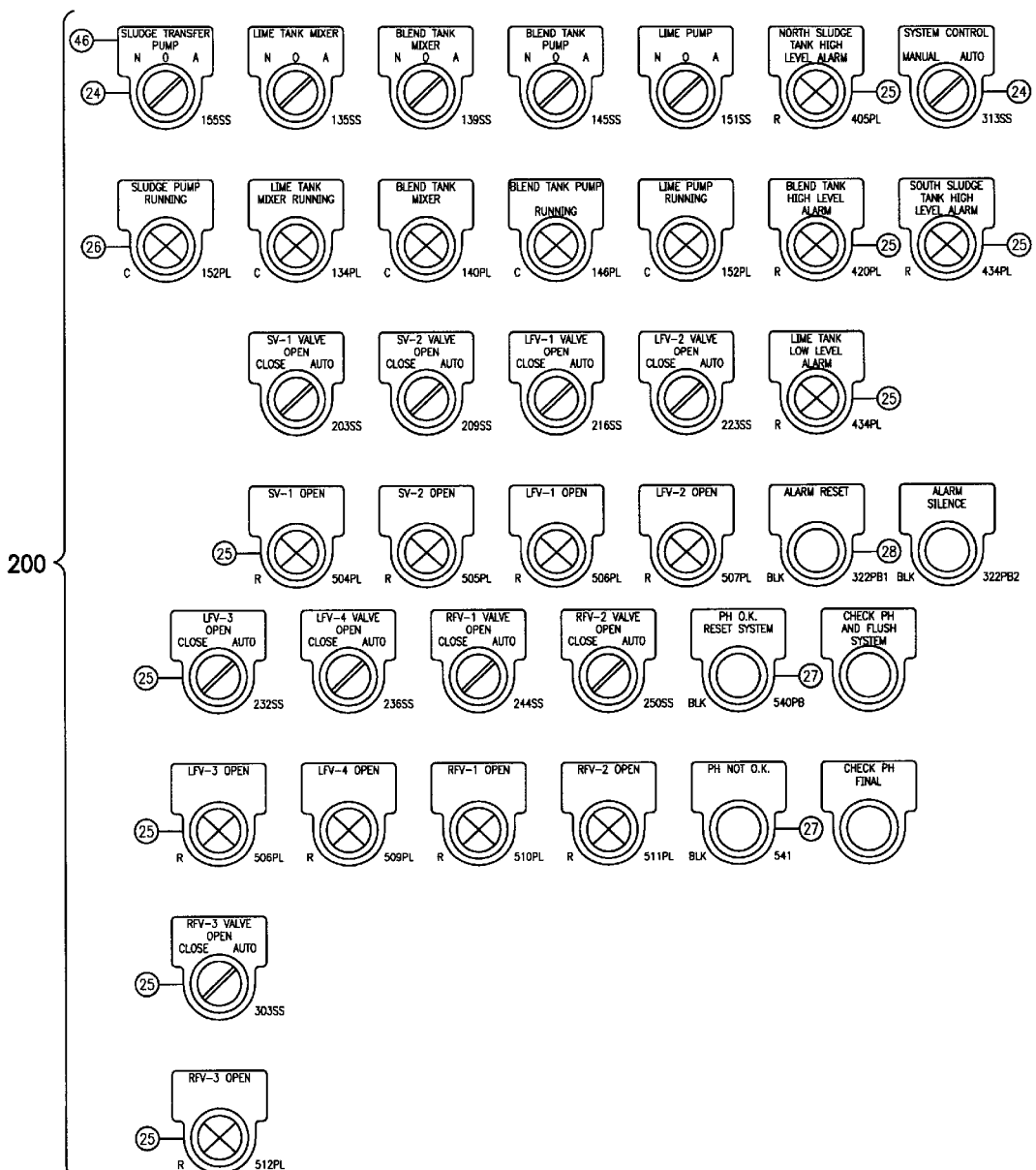
Figure 8:
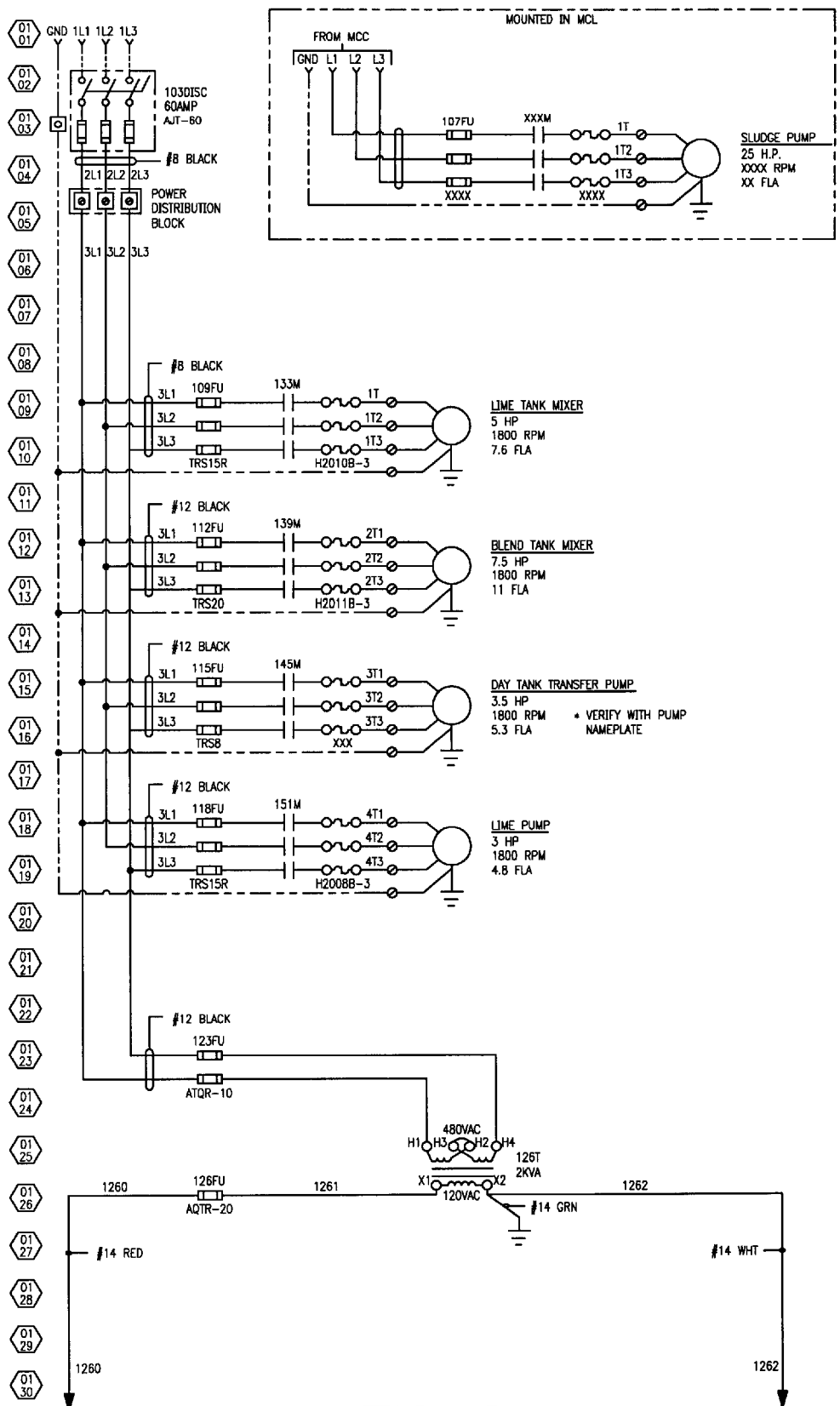
Figure 9:
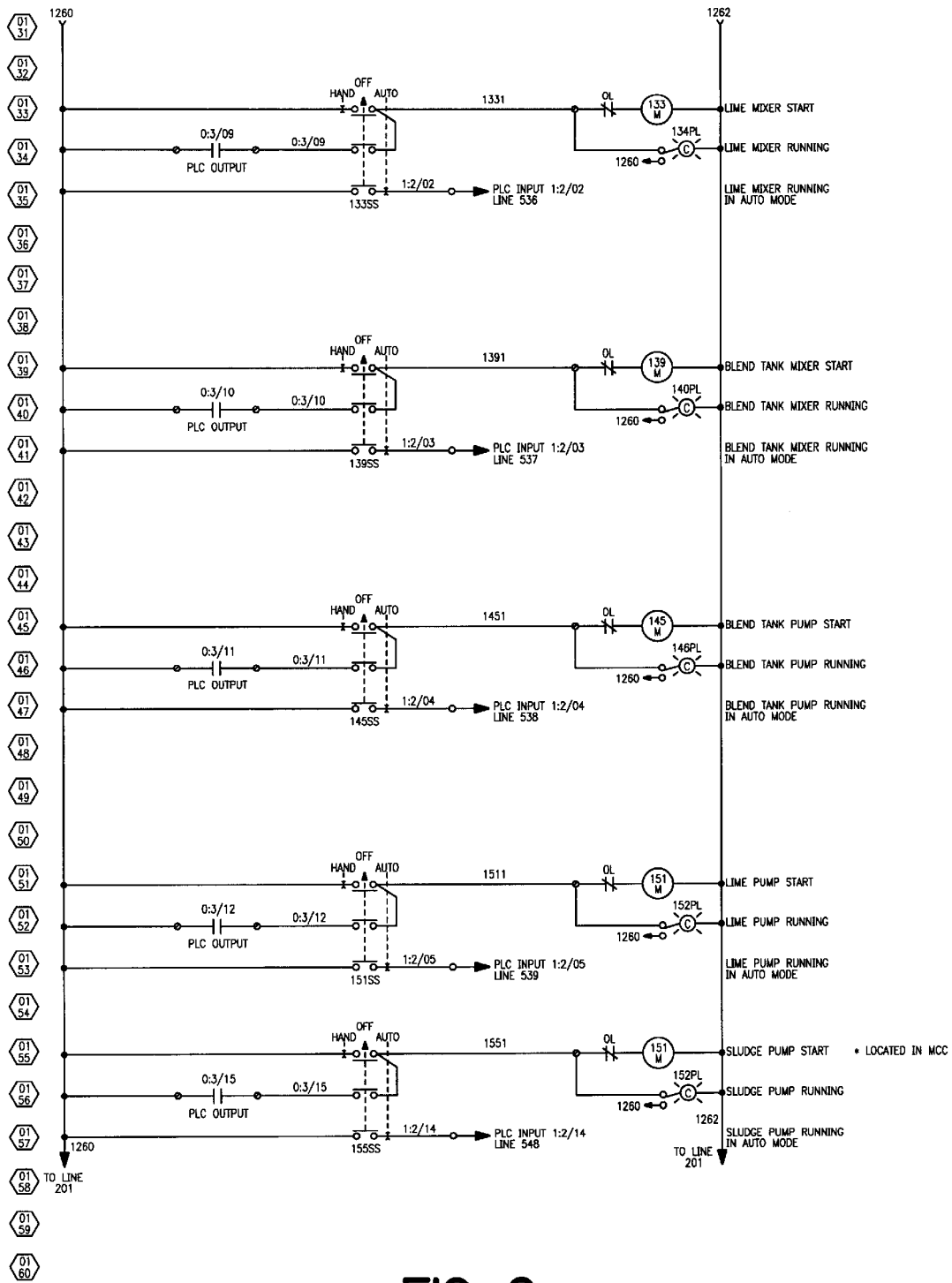
Figure 10:
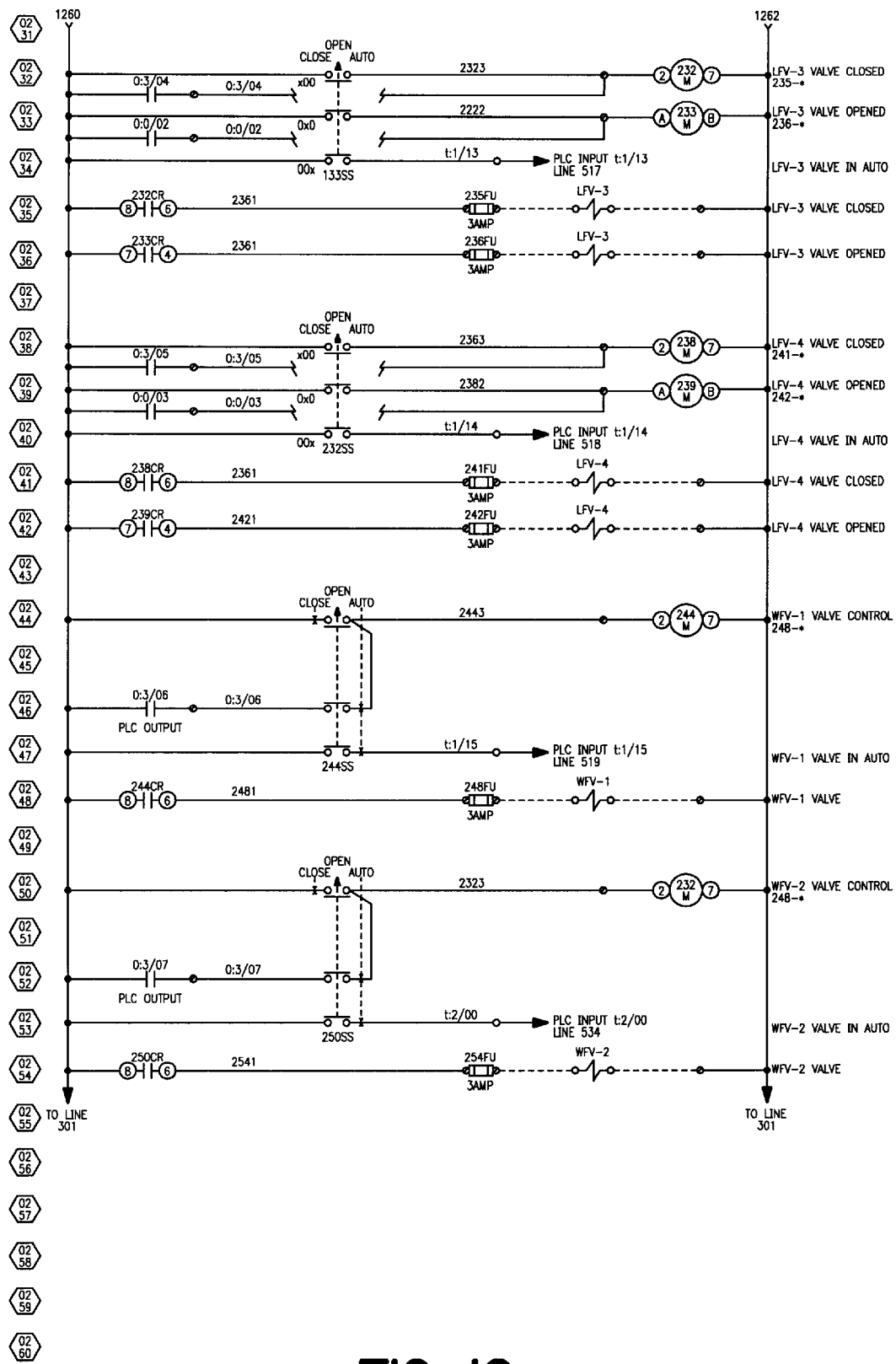
Figure 11:
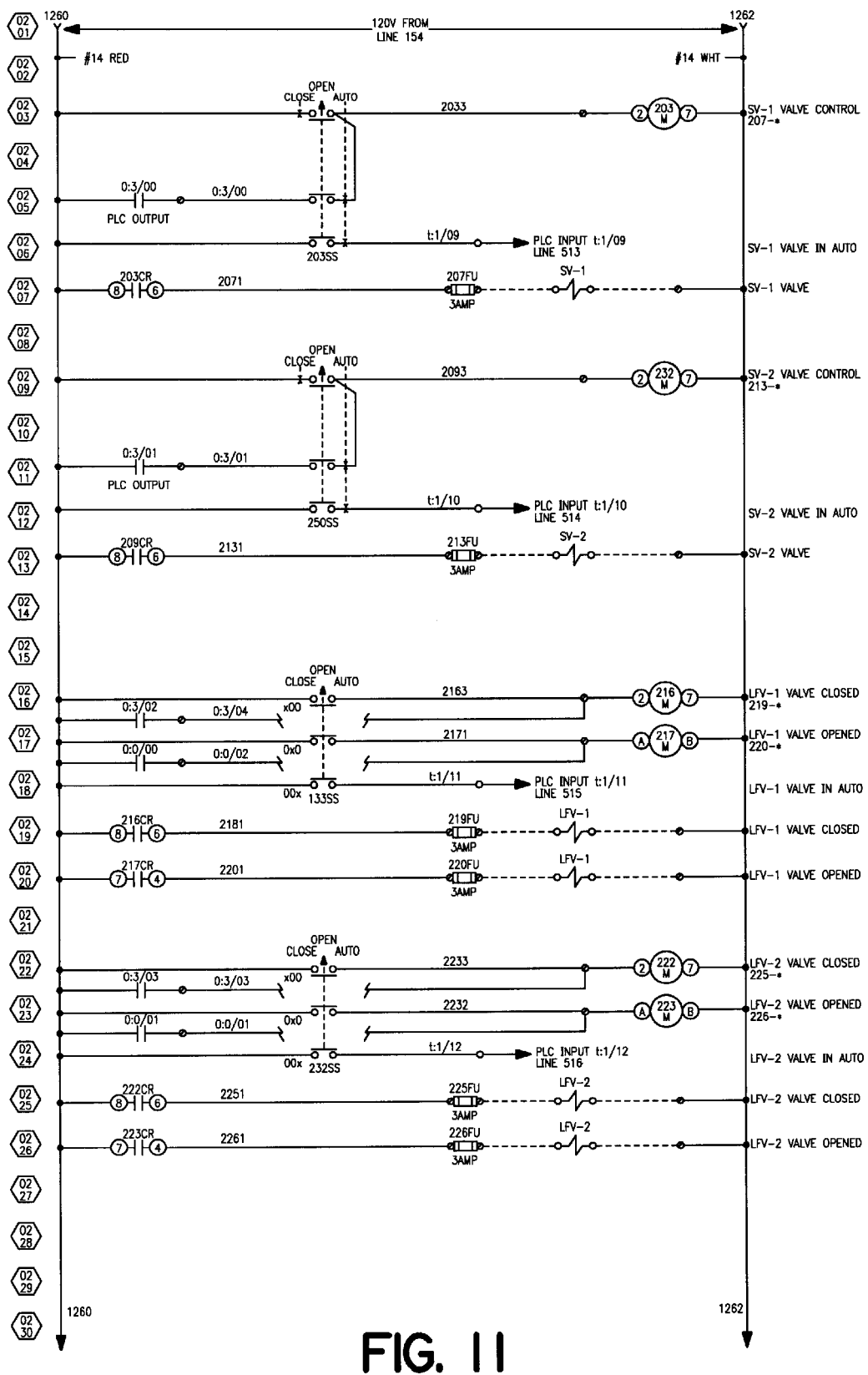
Figure 12:
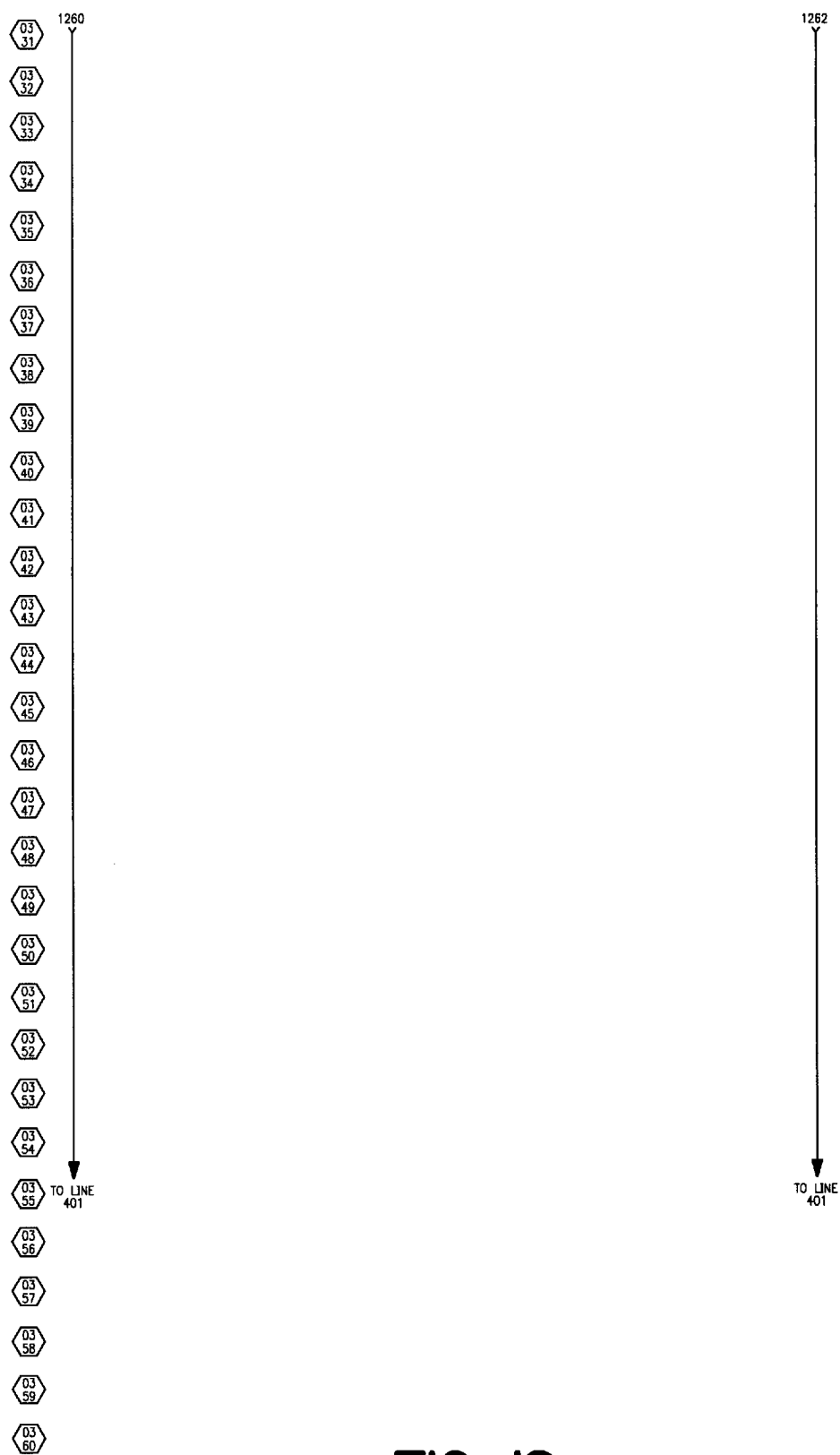
Figure 13:
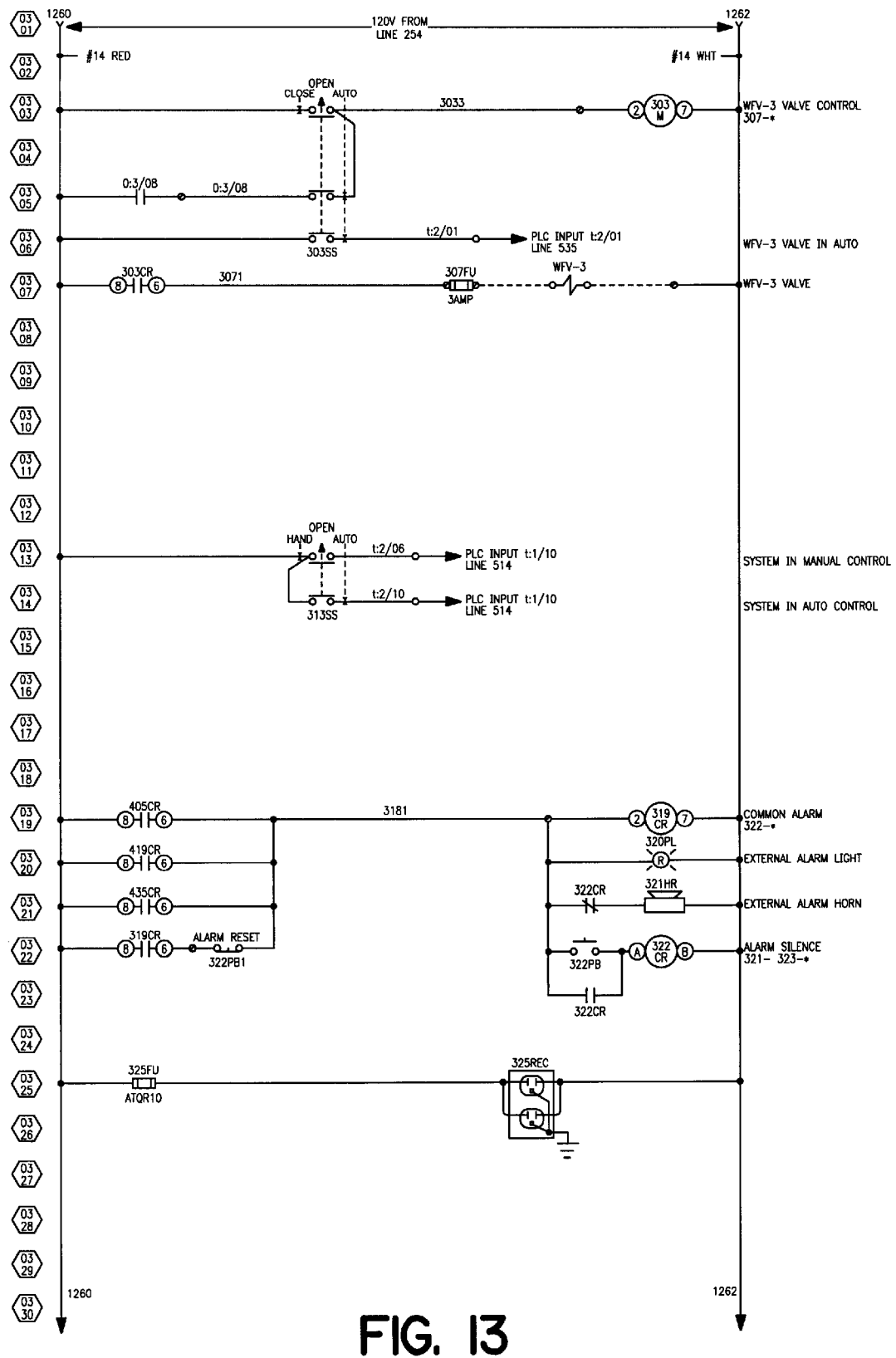
Figure 14:
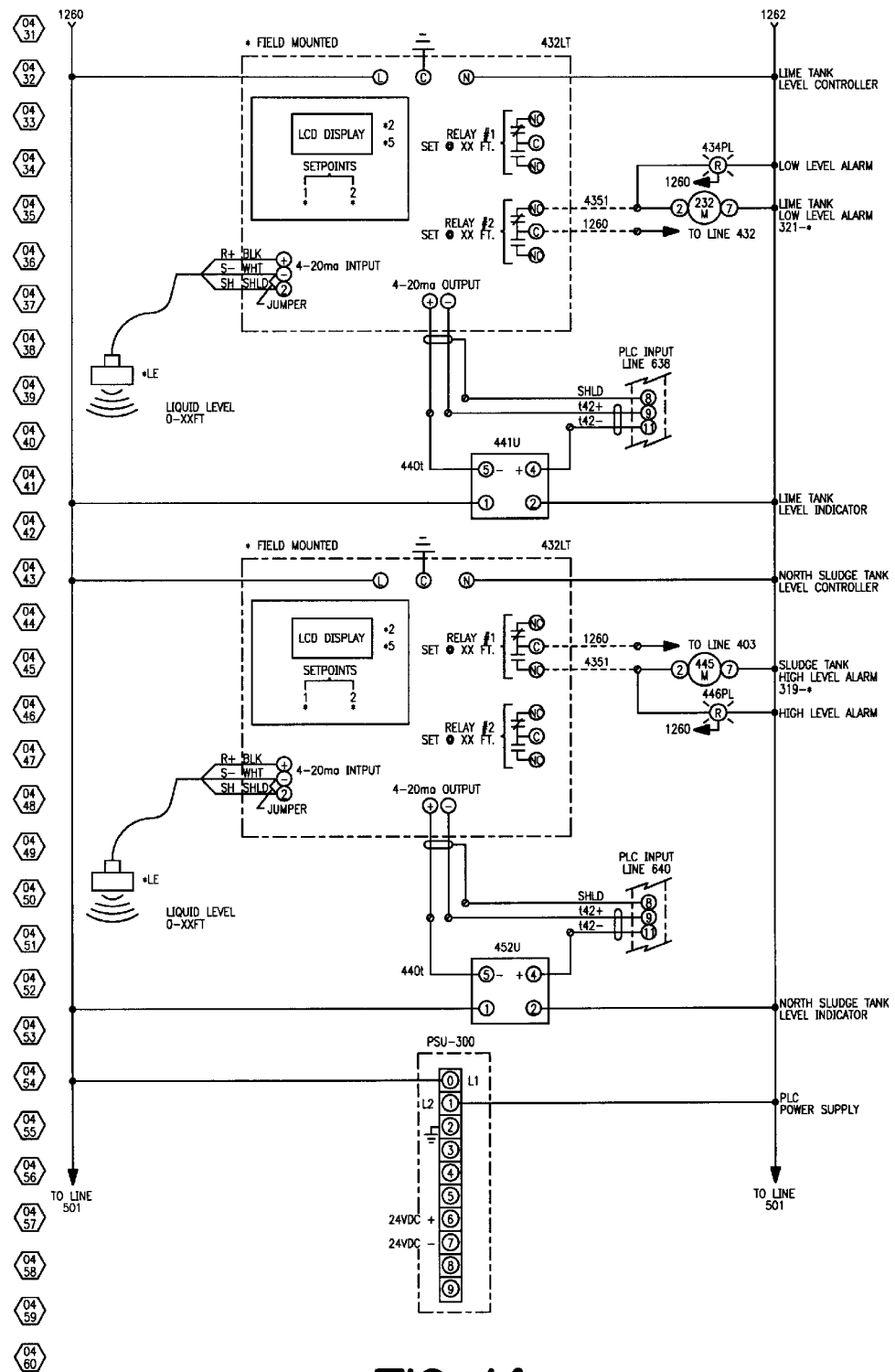
Figure 15:
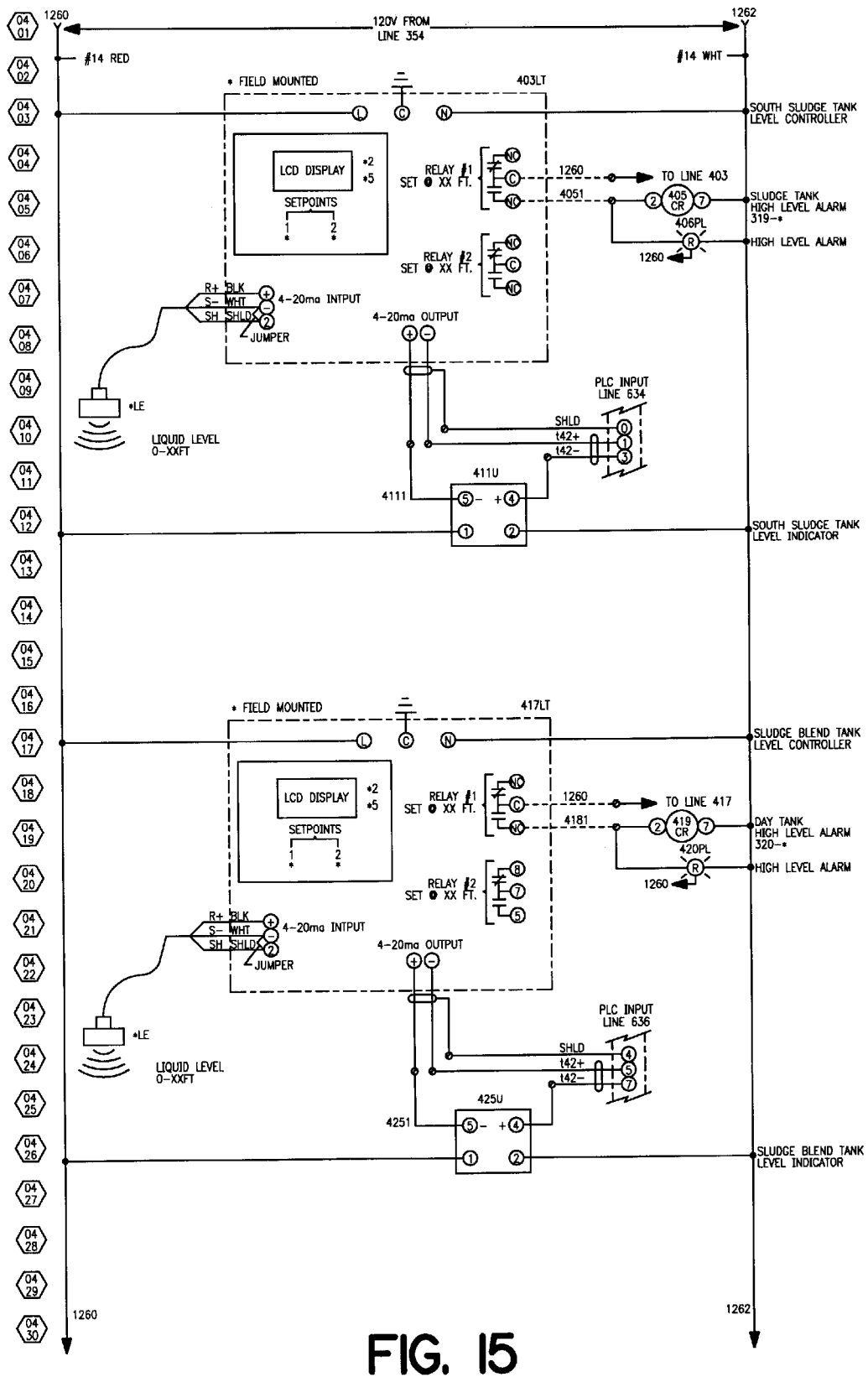
Figure 16:
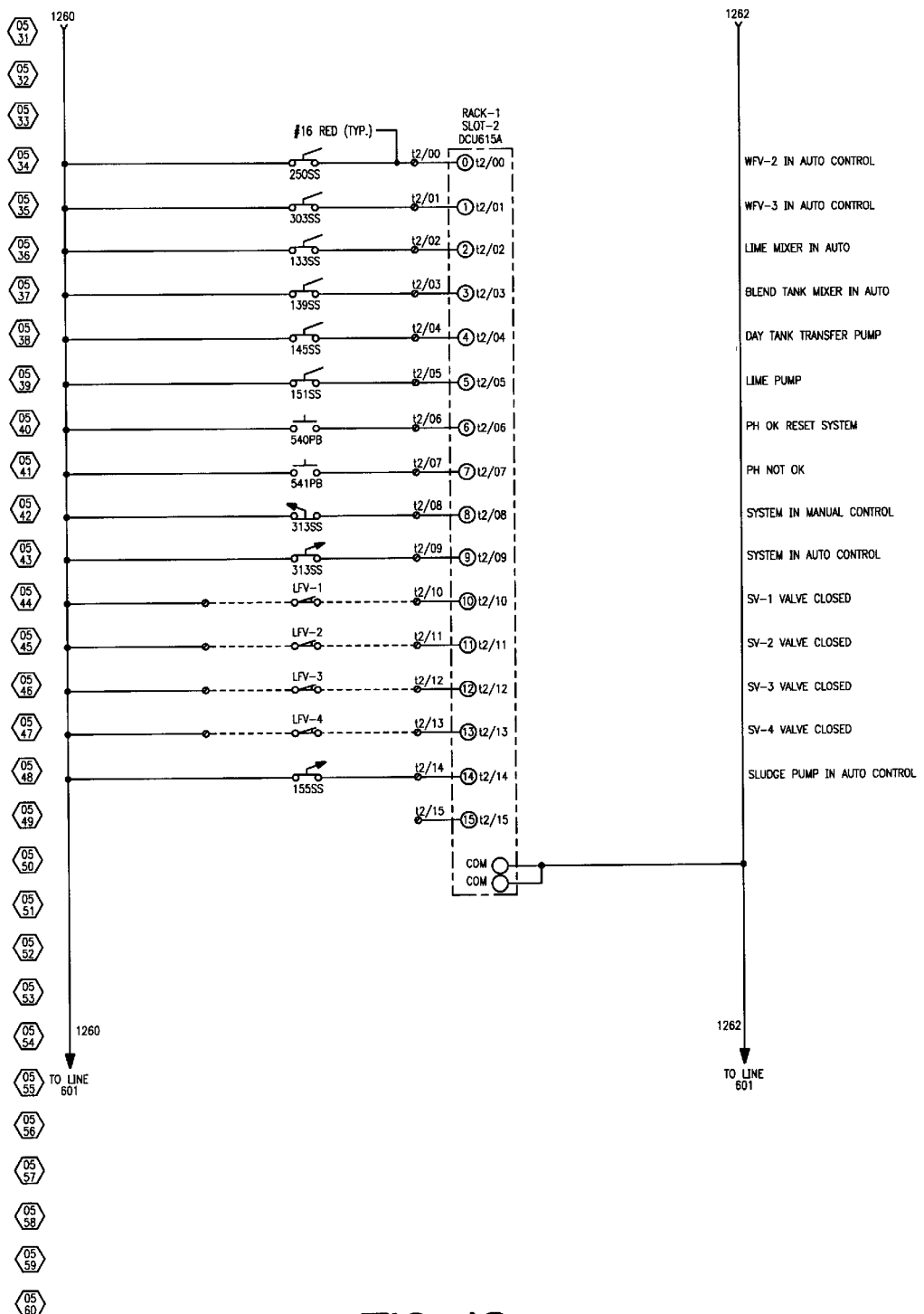
Figure 17:
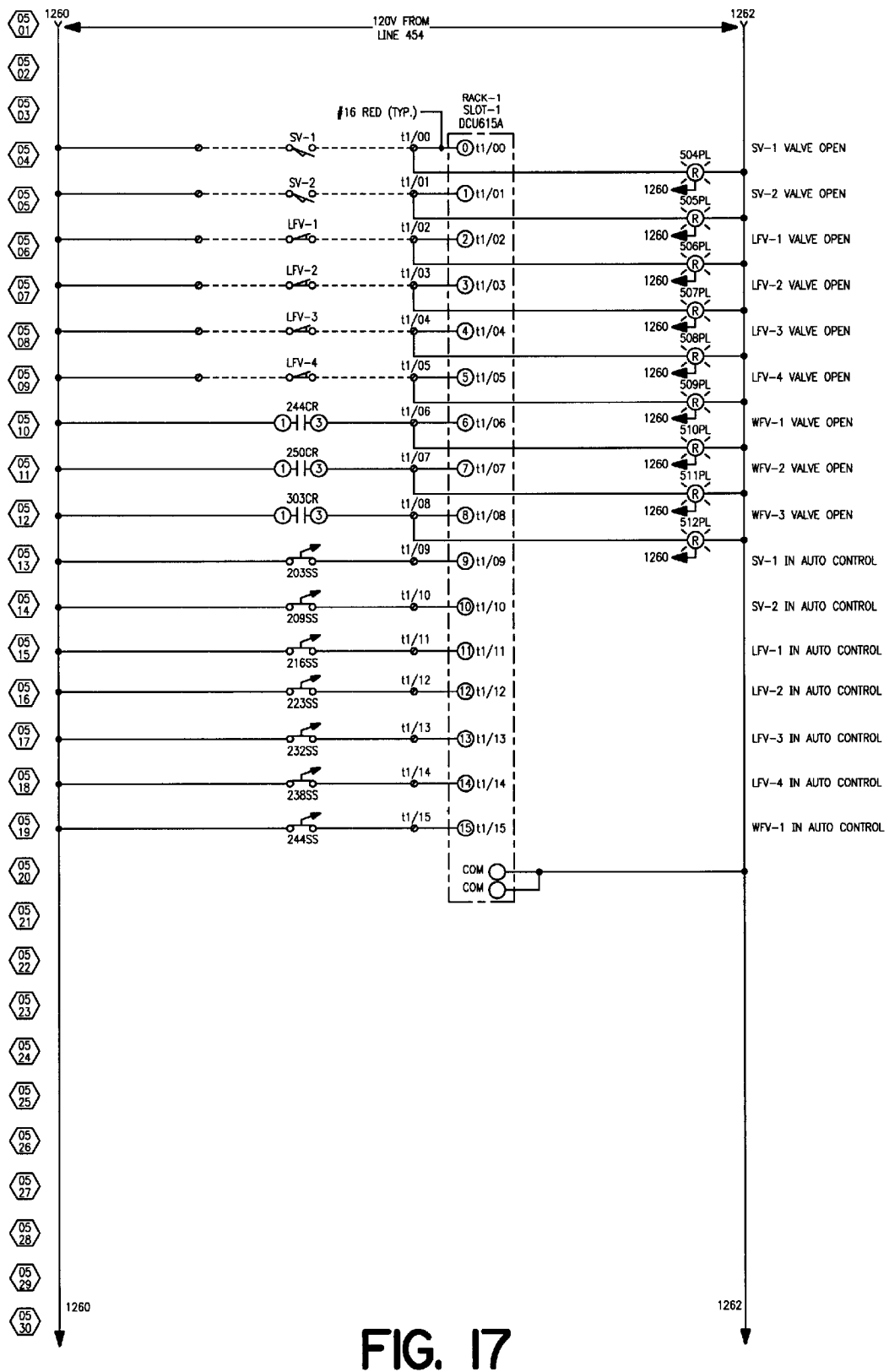
Figure 18:
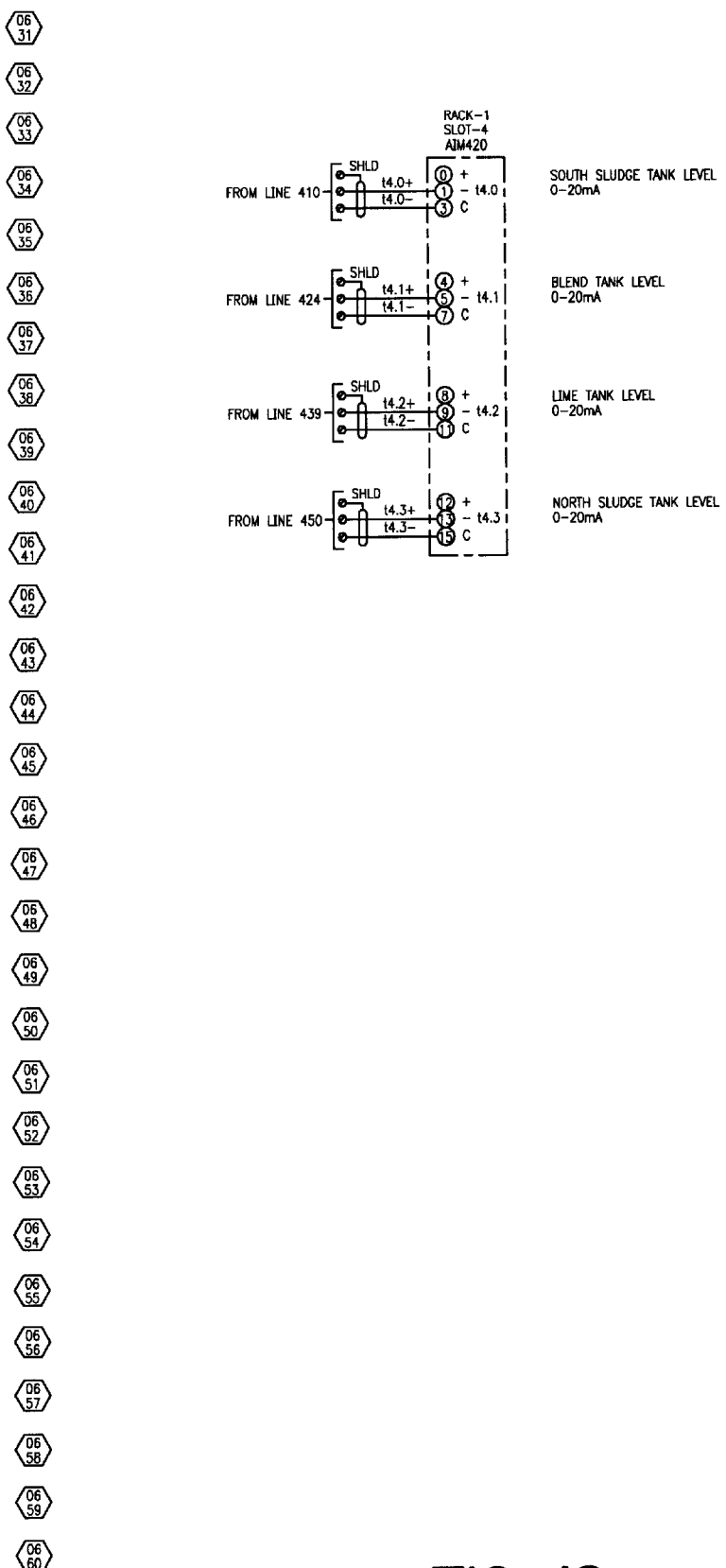
Figure 19:
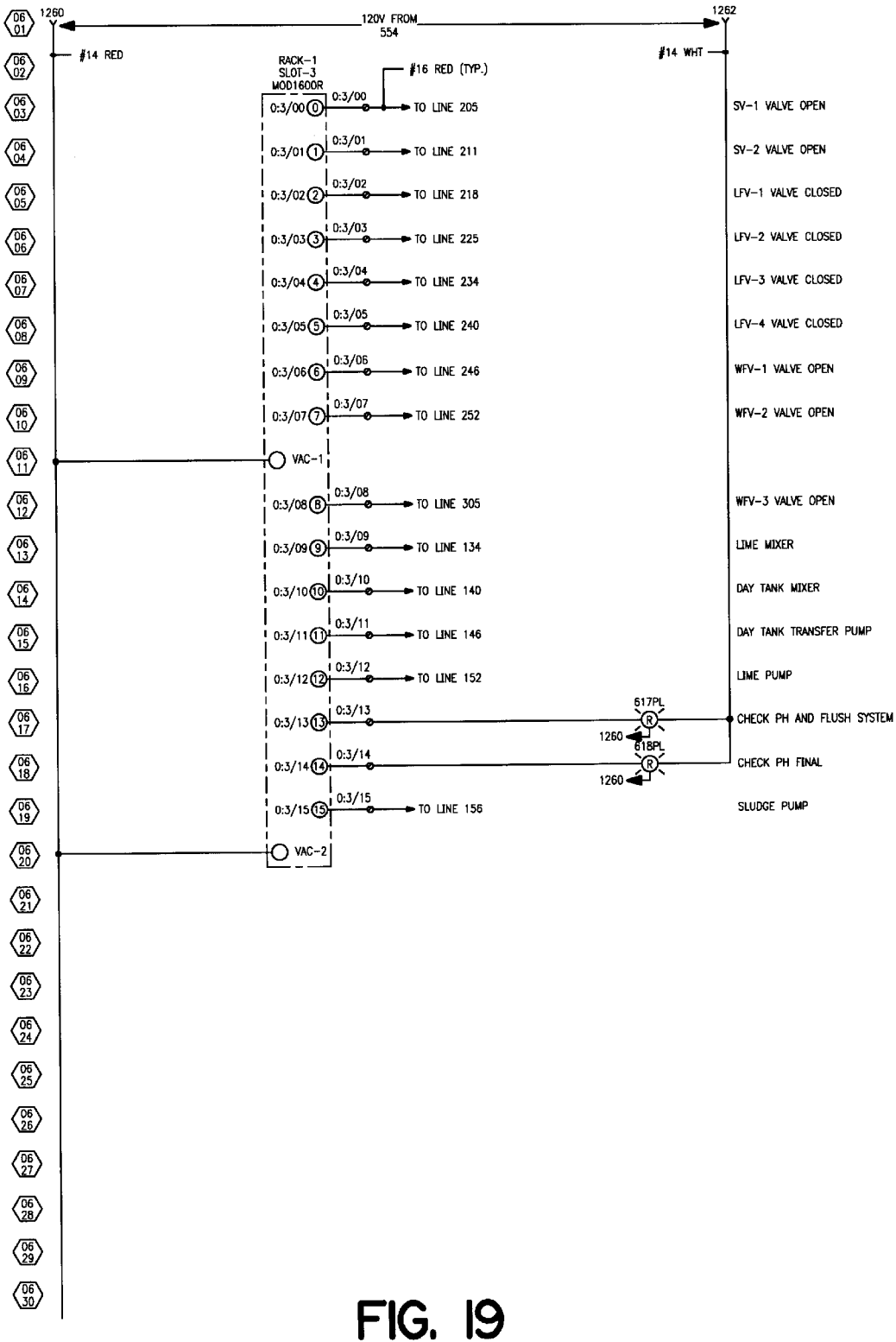
Figure 21:
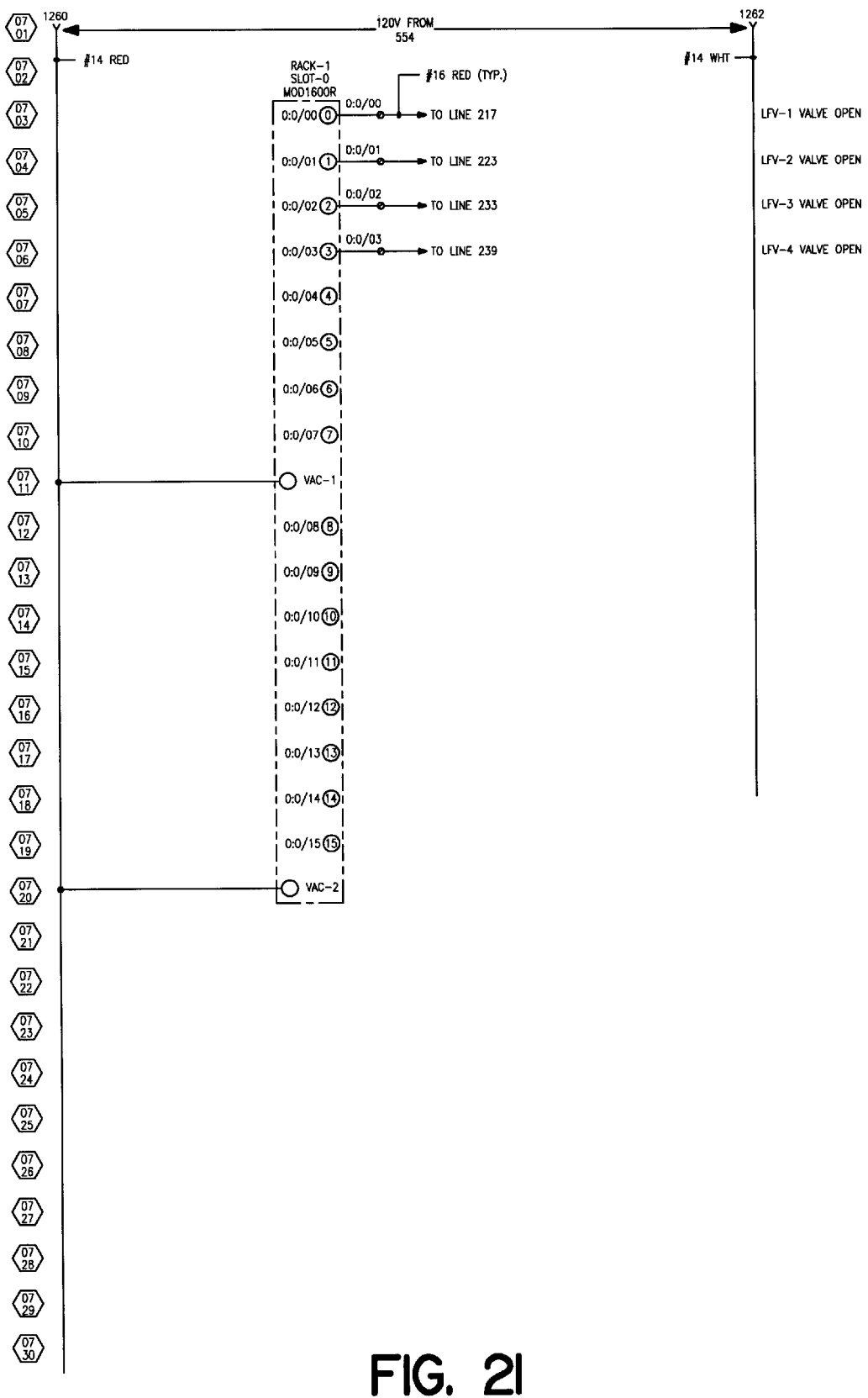
Figure 22:
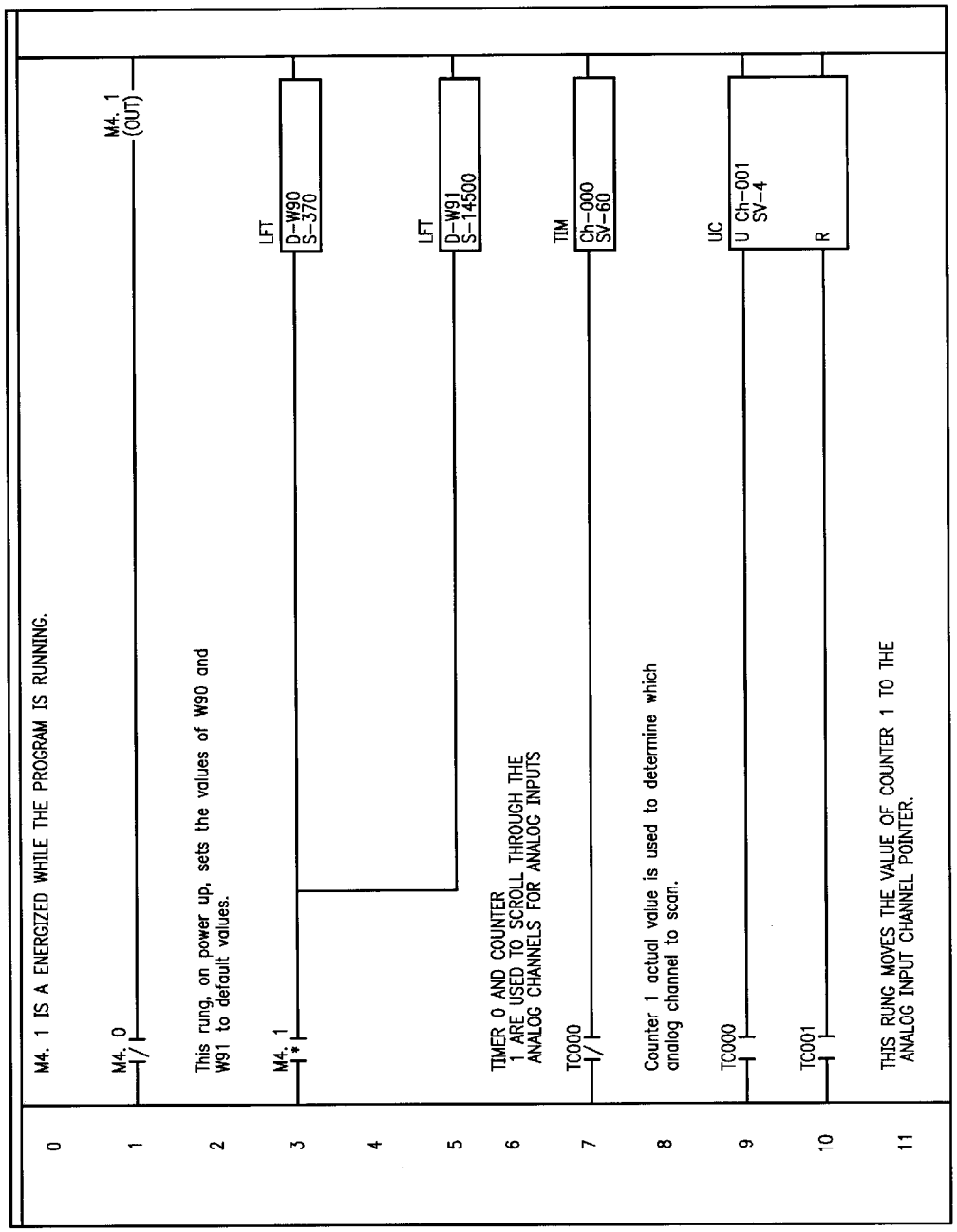
Figure 23:
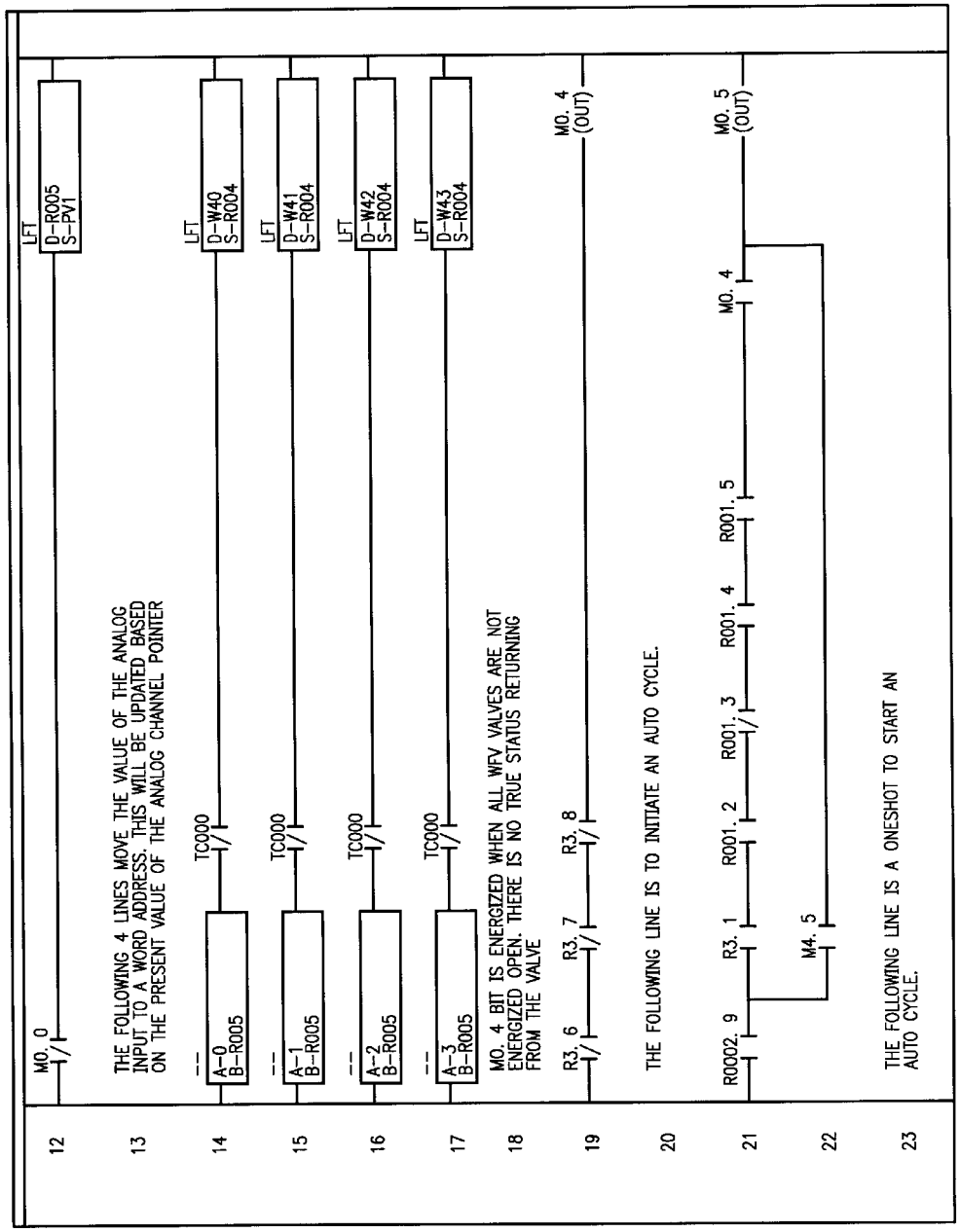
Figure 24:
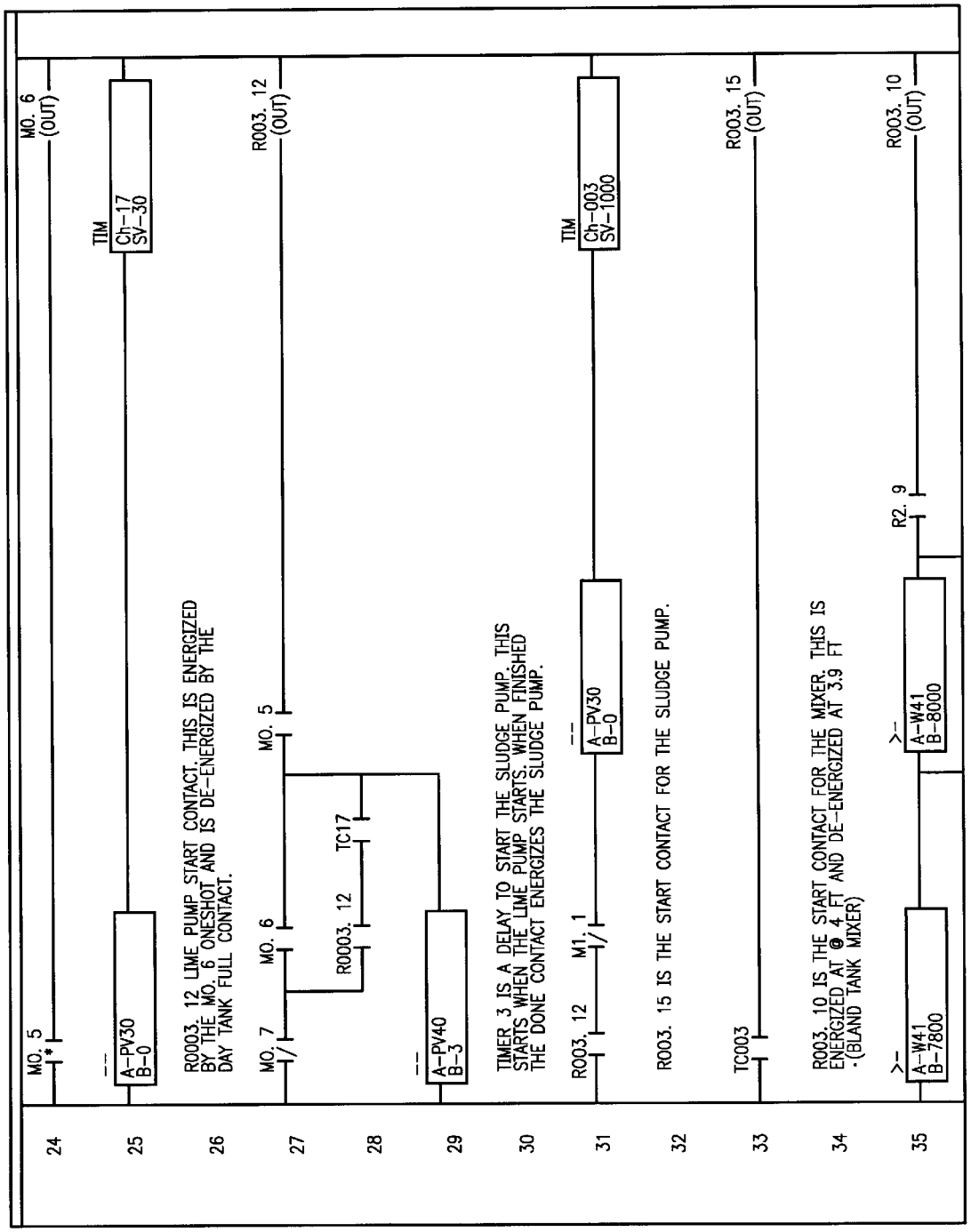
Figure 25:
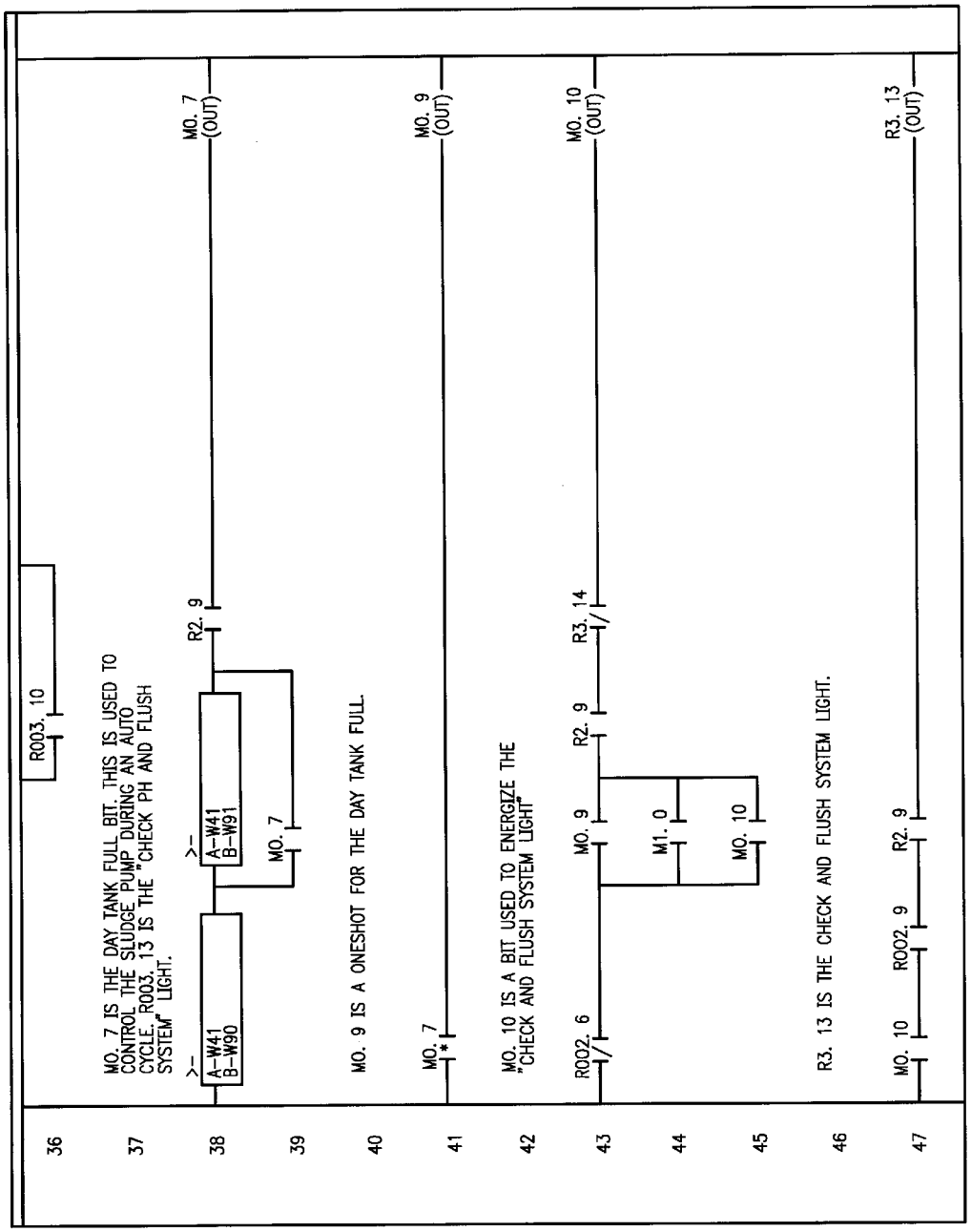
Figure 26:
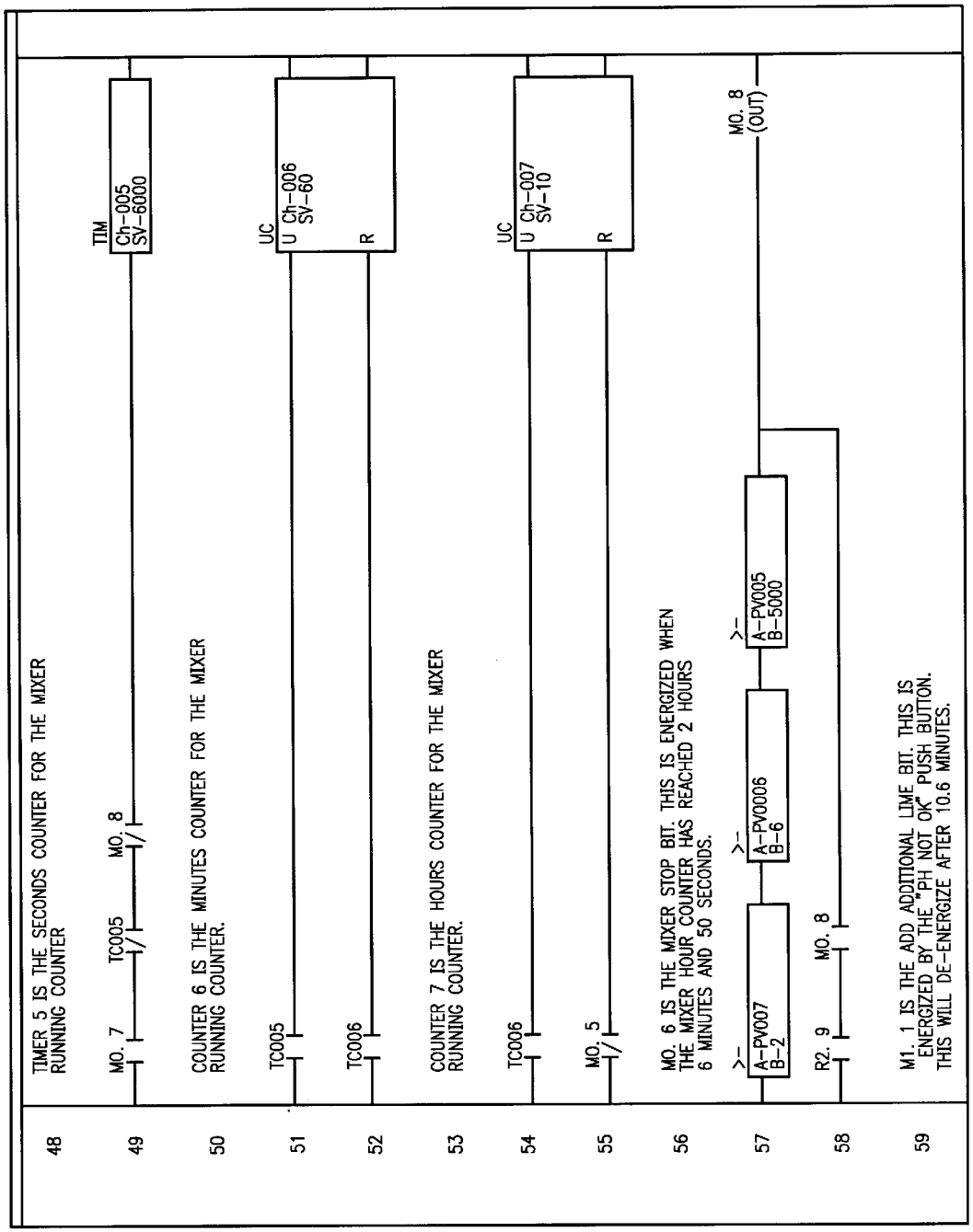
Figure 27:
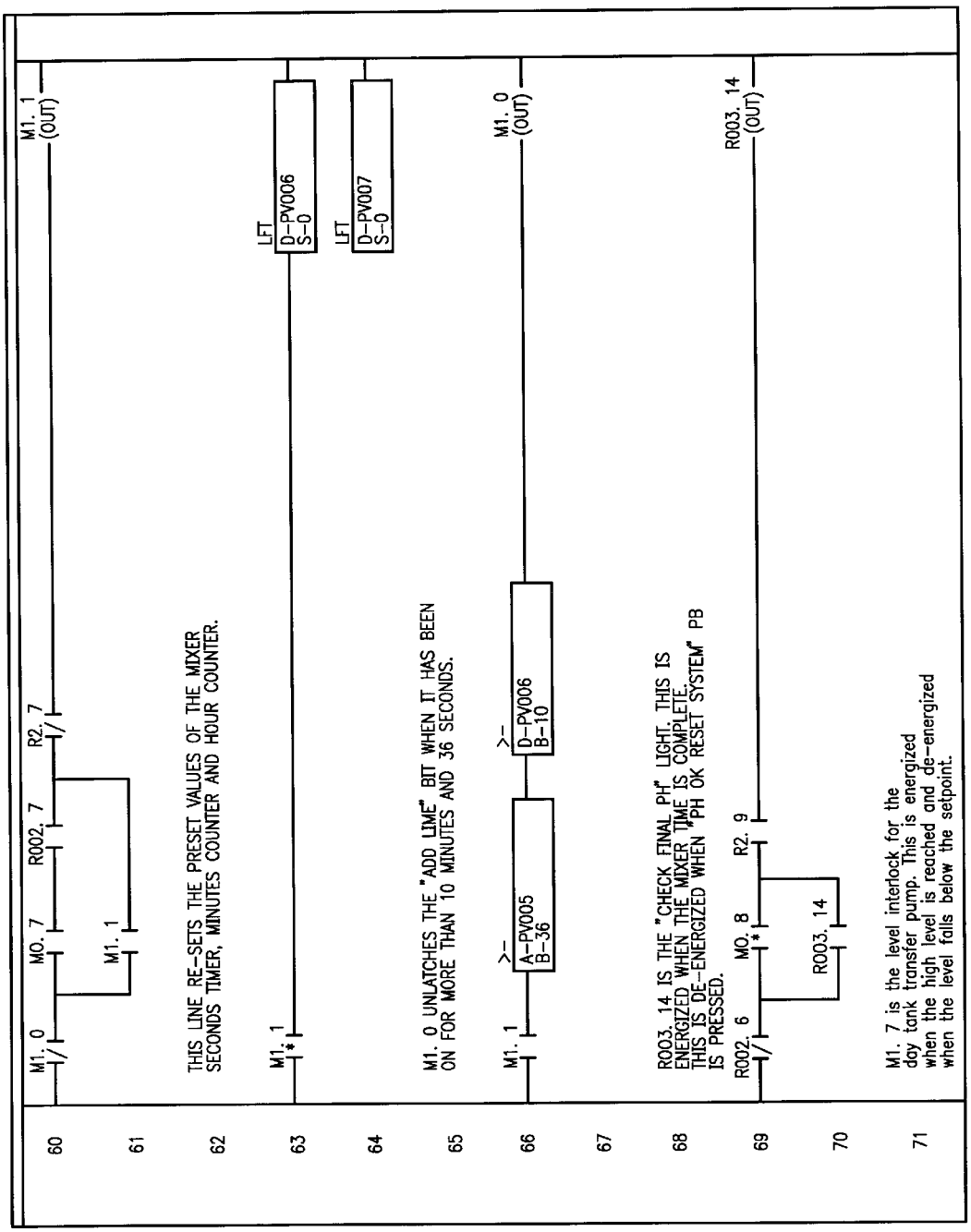
Figure 28:
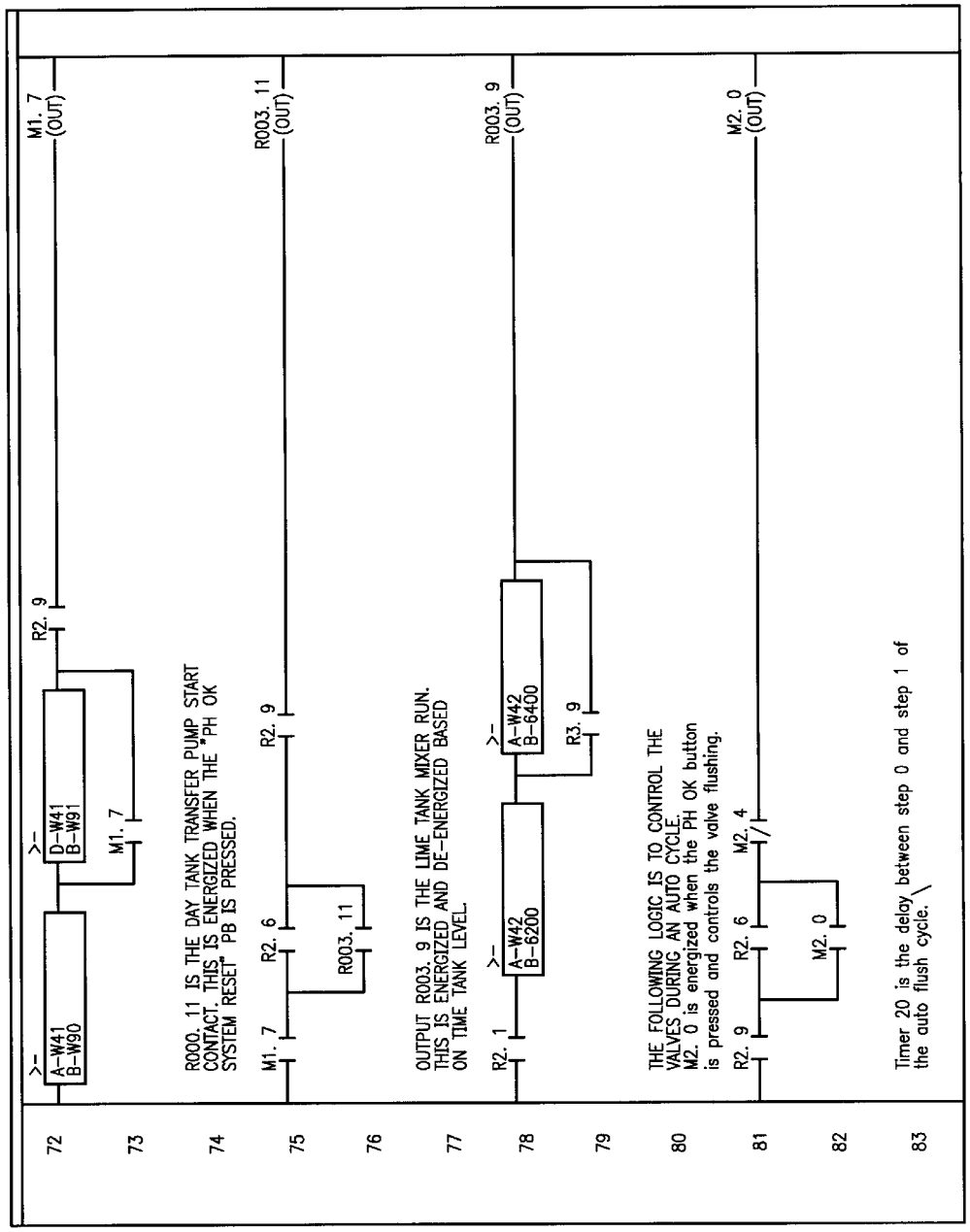
Figure 29:
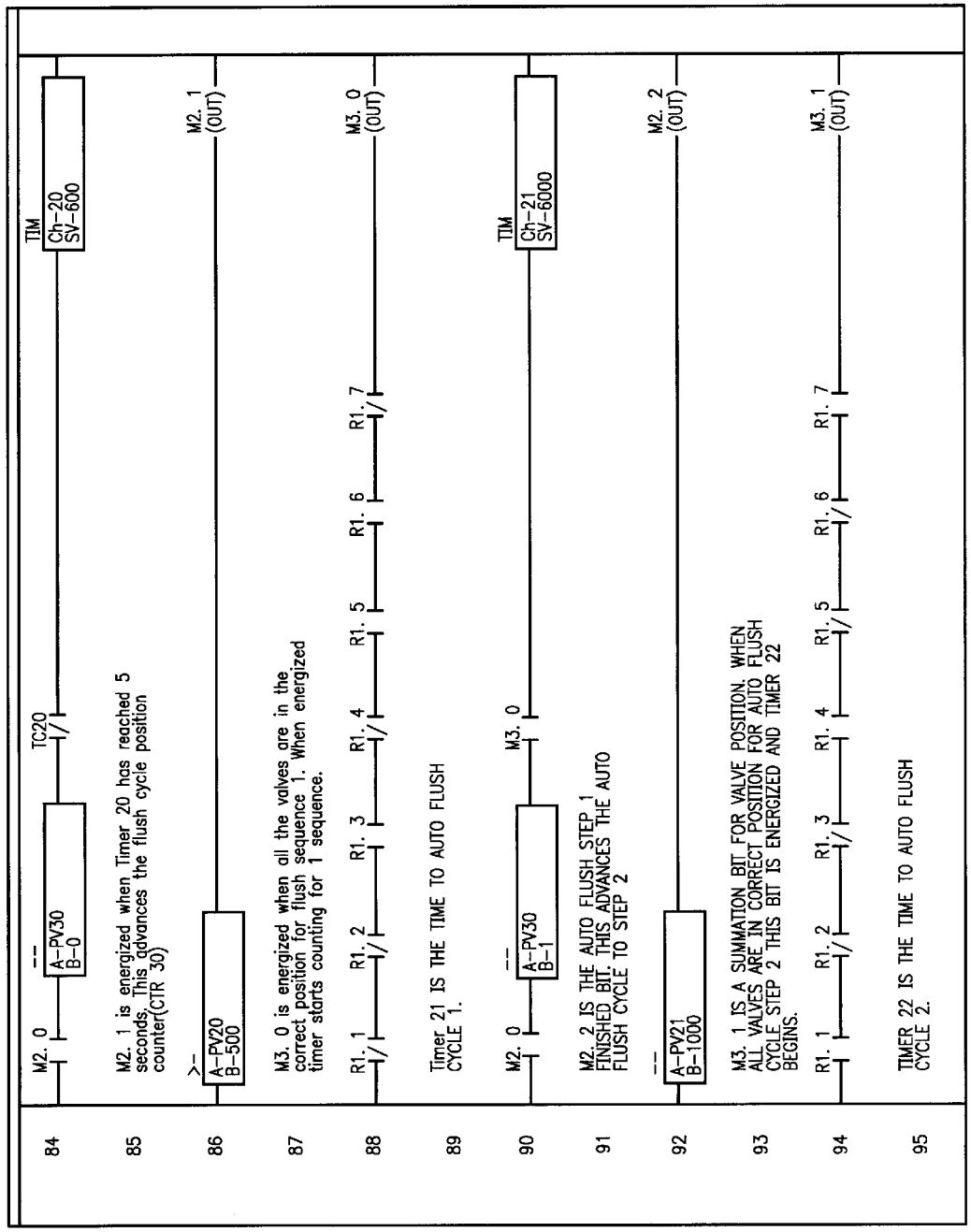
Figure 30:
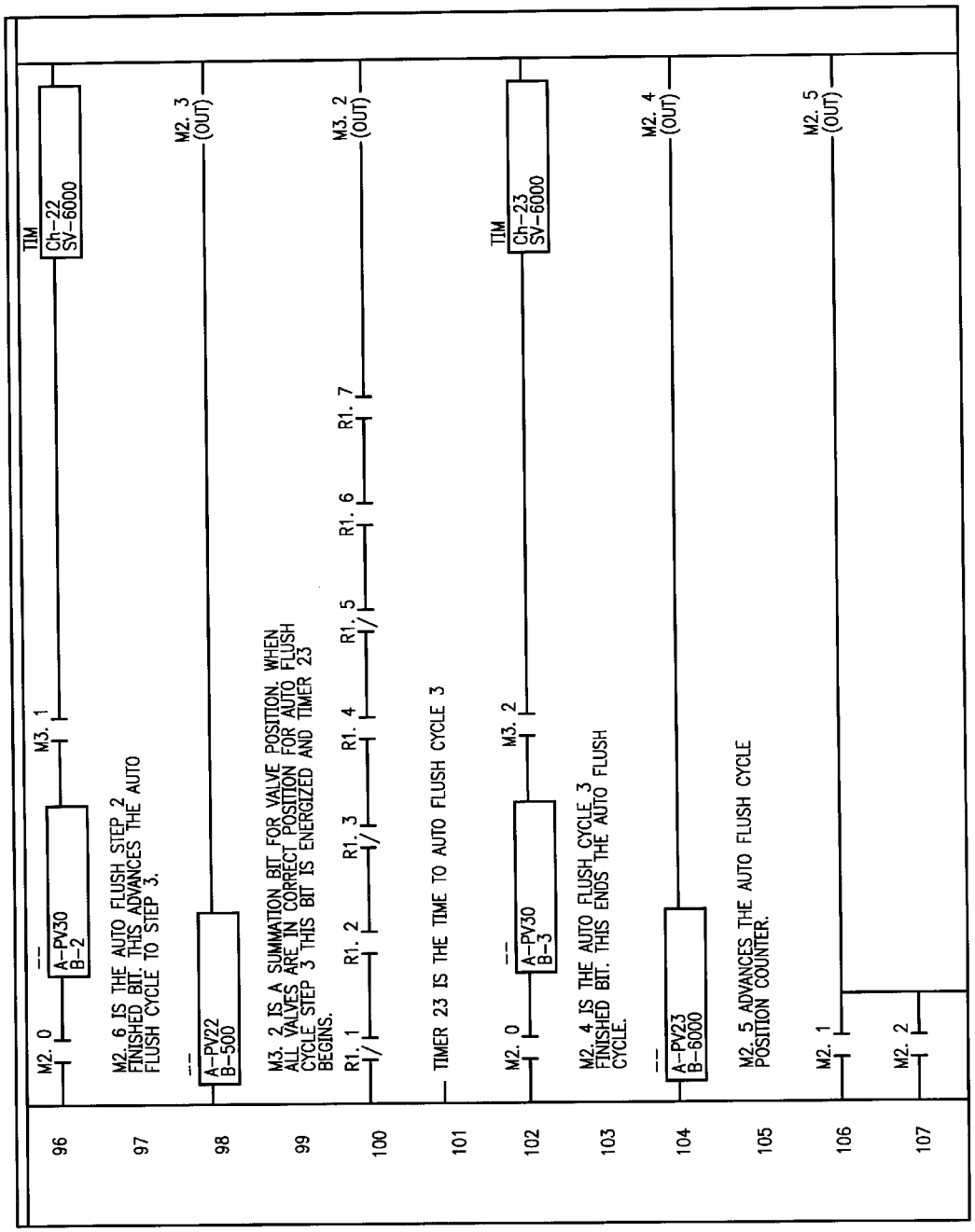
Figure 31:
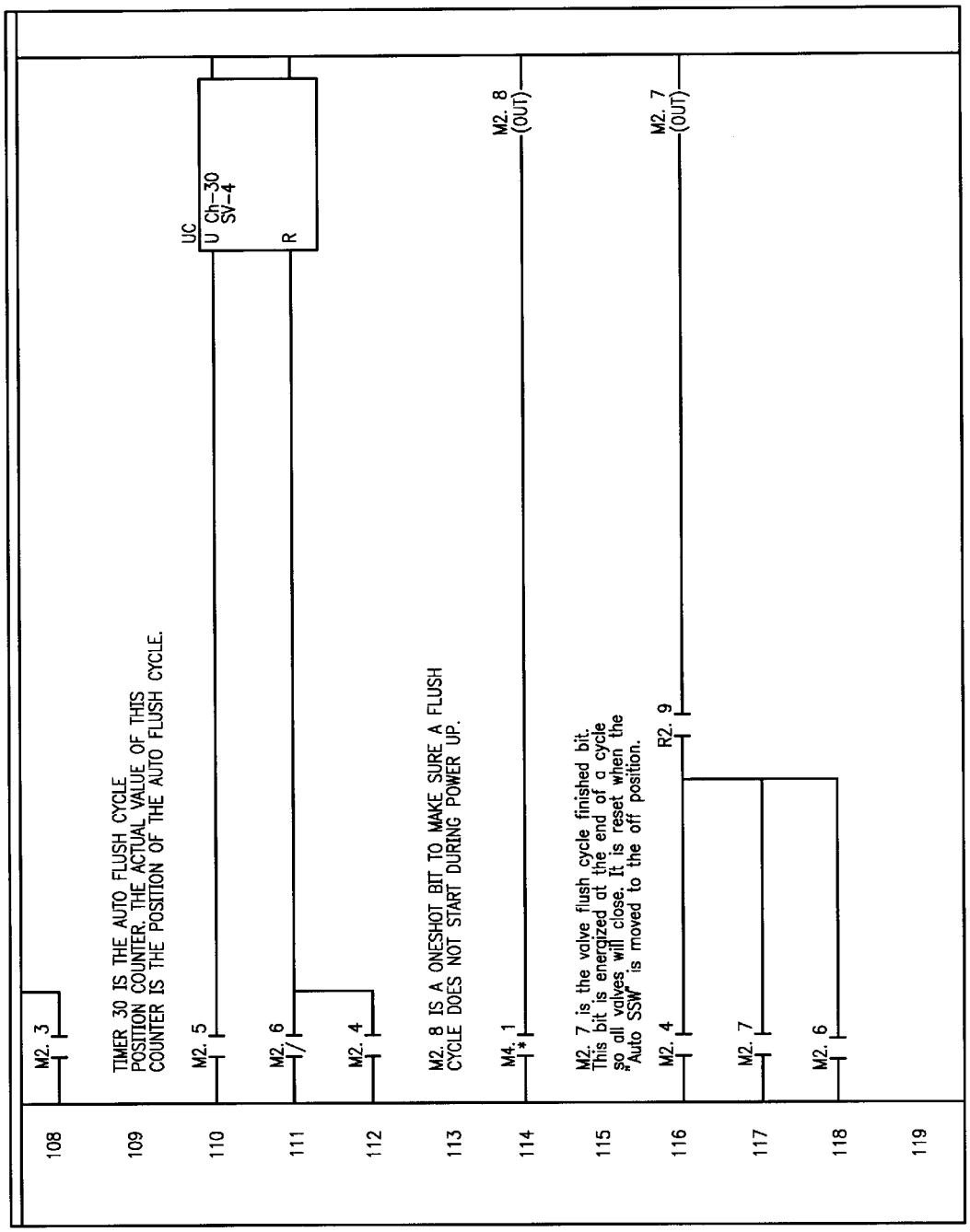
Figure 32:
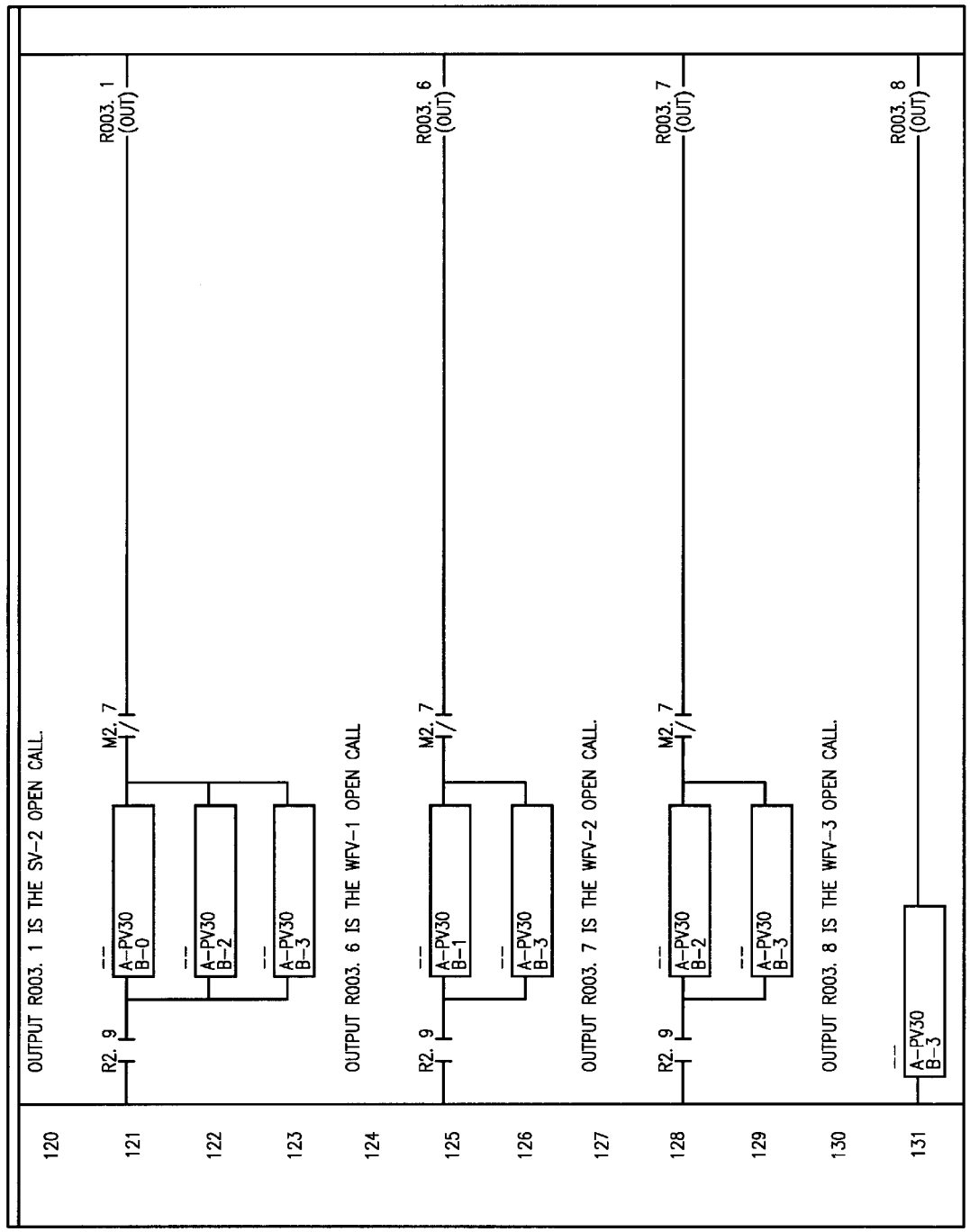
Figure 33:
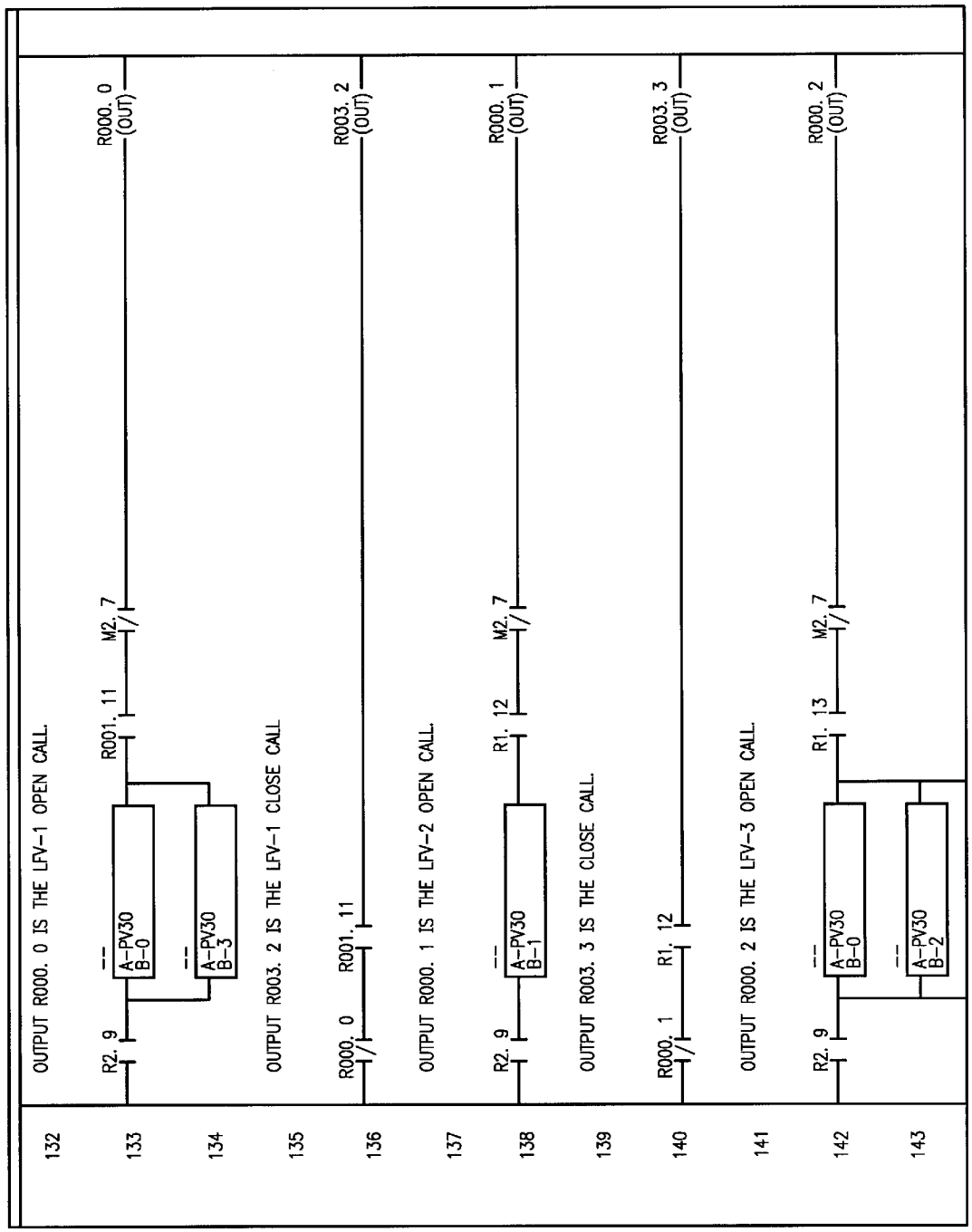
Figure 34:
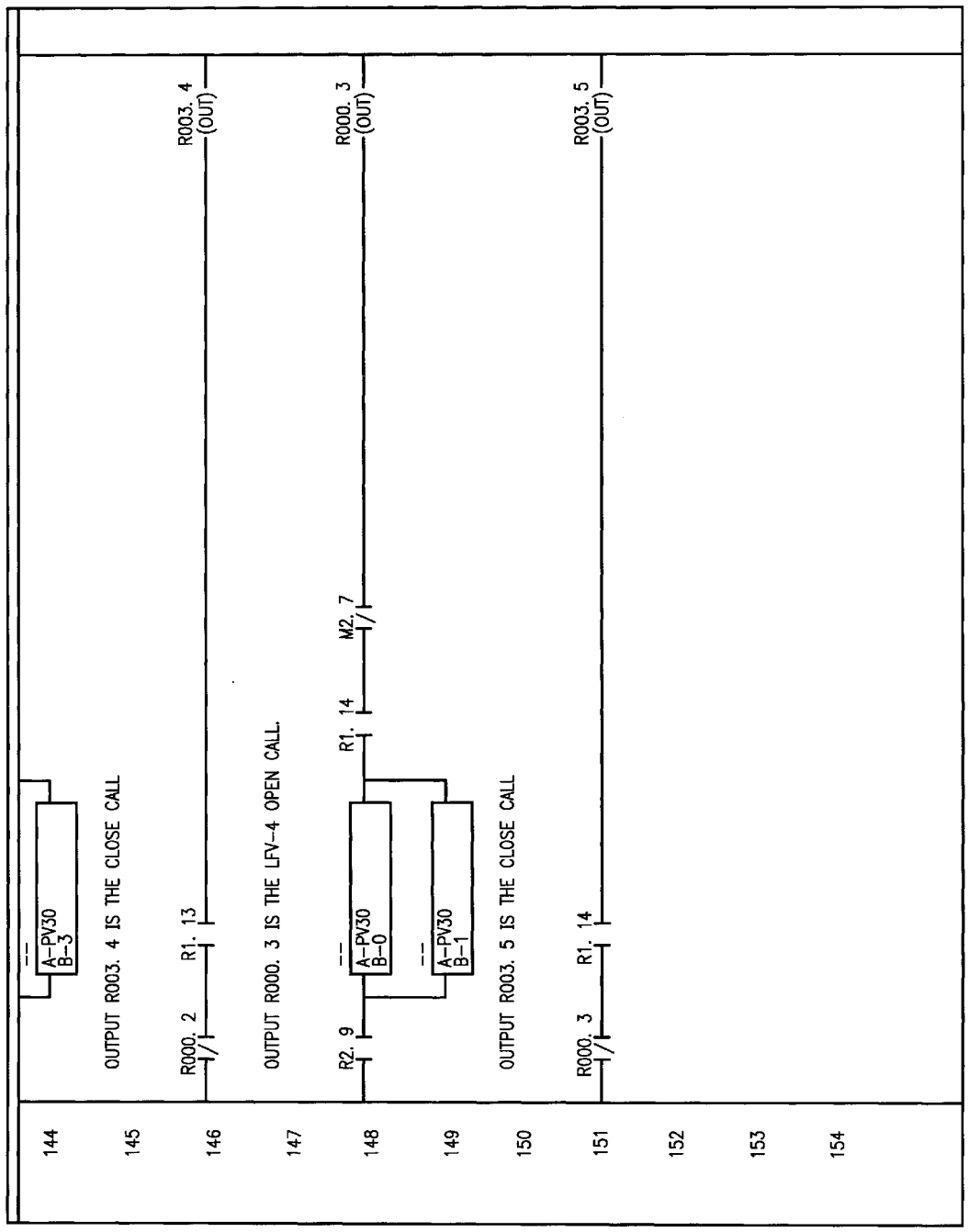

FIG. 7 is a schematic view of the panel 200 controlling the valves of FIGS. 2 to 6.

FIGS. 8 to 21 show the circuits for controlling the valve devices shown in FIG. 1.

FIGS. 22 to 34 show the program logic used to control the system of FIG. 1, PLC (programmable logic computer).

FIG. 1 is a schematic view of the system 100 of the present invention. The system 100 includes level sensors 153 in all tanks. A flow meter 118 is provided on raw bio solids feed line 119 and the feed is computer controlled. The system 100 includes water feed line 101 and pump 101A to a 50% liquid lime solids tank 102 with a mixer 103 and 107. At the bottom of tank 102 is a line 104 with a positive displacement pump 105 and with outlets 104A and 104B to two (2) tanks 106 and 106A. Plant efficient water (PEW) is added to tanks 106 and 106A to dilute the lime to 10% by weight. An outlet line 108 containing positive displacement pump 109 directs the diluted lime to branches 108A and 108B. The lime from line 108B goes directly into the sludge in line 119. The lime in line 108A goes to day tanks 110, 110A and 110B via outlets 108C, 108D and 108E which are stirred by mixers 111, 111A and 111B. A line 152 from tank 102 through pump 109 is connected to line 108 to allow 50% liquid lime to be inputted into the sludge and/or day tanks 110, 110A or 110B to adjust the pH of the sludge, if necessary. Alternately, line 150 can input the 50% lime directly into the day tanks 110, 110A and 110B, as in FIGS. 2 to 6. The sludge is pumped in line 119 by pump 117 through the flow meter 118. The treated sludge is held for two (2) hours at pH 12.0 measured by sensor 154 in tanks 110, 110A and 110B and then sent to a bio solids storage tank 112 via line 113 using a positive displacement pump 114 and stored for six (6) months. Sensors 153 monitor the liquid levels in the day tanks 110, 110A and 110B. Upon completion of the six (6) month period, the aged and treated sludge is pumped by positive displacement pump 115 via line 116 to tankers which carry the treated sludge to land application sites to fertilize the soil. Due to the treatment, the sludge is rendered safe for this purpose.

In FIGS. 2 to 6, a preferred progressive cavity pump with a variable speed drive is shown for the pump 109 in FIG. 1. Some pumps are described in U.S. Pat. No. 4,651,897 to Johnson; U.S. Pat. No. 4,773,834 to Saruwatari; U.S. Pat. No. 5,474,432 to Hulley et al; U.S. Pat. No. 5,759,019 to Wood et al and U.S. Pat. No. 5,779,460 to Marz for instance.

The feed operated sequence is described.

1. All valves are checked to make sure they are in proper position as set forth in Table 1 and FIG. 2. In these Figures, the operation of the various valves on an operation panel 200 is shown in FIG. 7.

TABLE 1

(NOTE: VALVE SV-1 IS MANUAL OPERATION ONLY)

| VALVE # | Open | Closed | Type of Valve |
|---|---|---|---|
| SV-1 | X | | Dezurik knife gate & air actuator, with speed control, asco air solenoid, open & closed indicator (MANUAL OPERATION ONLY) |
| SV-2 | X | | Dezurik knife gate & air actuator, with speed control, asco air solenoid, open & closed indicator |
| LFV-1 | X | | 1" In-line ball valve, electric operator, on-off service |
| LFV-2 | | X | 1" In-line ball valve, electric operator, on-off service |
| LFV-3 | X | | Asco solenoid valve |
| LFV-4 | X | | Asco solenoid valve |
| WFV-1 | | X | Asco solenoid valve |
| WFV-2 | | X | Asco solenoid valve |
| WFV-3 | | X | Asco solenoid valve |

2. Turn system switch to "A" on the "H-O-A" switch on panel 200. This will then perform the following operation: Using tank 110 as an example.

a. Lime pump 109 will start and run for 10 seconds and continue to run as long as the sludge pump 117 is running;

b. Sludge pump 117 starts and pumps sludge to day tank 110;

c. When level in day tank 110 gets 4 feet above the floor of the tank 110, the mixer 111 will start;

d. When day tank 110 is full, sludge pump 117 will shut off (mixer 111 will continue to run);

e. Panel light comes on "Check pH and flush system" (operator then goes out to tank to check pH). If pH is above 12.0, operator leaves system running. NOTE: If pH is not 12.0, press "pH not OK" to pause cycle;

f. Mixer 111 shuts off, light on panel comes on "Check pH-Final". Operator then goes out to tank 110 and checks the pH again, if pH is still 12.0 or better, operator presses "pH OK-Flush System" button on the control panel at the day tank 110 and flush cycle starts;

g. Pump 114 in day tank 110 starts and pumps day tank 110 to the sludge storage tank 112, mixer 111 stops when level in tank 110 reaches 4 feet above the floor;

h. After day tank 110 is pumped down, cycle is complete and another cycle can be started; and i. SV-2 closes, and LV-1 and LV-3 closes.

3. (MANUAL OPERATION ONLY) If a level of 12.0 pH is not achieved, operator must add additional lime to the day tank 110 to achieve a level of 12.0 pH. This is accomplished as follows:

a. Make sure the following valves are open and/or closed as in Table 2 and FIG. 3:

TABLE 2

| VALVE # | Open | Closed |
|---|---|---|
| SV-1 | | X |
| SV-2 | | X |
| LFV-1 | | X |
| LFV-2 | X | |
| LFV-3 | X | |
| LFV-4 | X | |
| WFV-1 | | X |
| WFV-2 | | X |
| WFV-3 | | X | b. Turn "Lime Pump" switch to "H" (hand), Lime Pump 109 will come on and run for 10.6 minutes (amount of time to add an additional 5% liquid lime by dry weight) plus 10 seconds to contents of day tank 110.

c. When "Lime Pump" is turned on by "H", (the mixer 111 will continue to run until pump 114 in day tank 110 pumps sludge down to 4 feet above the floor). After two (2) hours, operator must check for 12.0 pH in tank 110, if Ok, then pushes "pH OK, Flush System" button on control panel at day tank 110, system is now ready for next batch.

4. After each pH check, any lines with liquid lime must be flushed to prevent the liquid lime from settling in the lines 108, 108A or 108B. This procedure is as follows:

5. SPIKE LINE 108A: (ONLY NEED TO FLUSH IF LINE WAS USED)

a. Make sure valves are set as follows as in Table 3 and FIG. 4:

TABLE 3

| VALVE # | Open | Closed |
|---|---|---|
| SV-1 | | X |
| SV-2 | | X |
| LFV-1 | | X |
| LFV-2 | X | |
| LFV-3 | | X |
| LFV-4 | X | |
| WFV-1 | X | |
| WFV-2 | | X |
| WFV-3 | | X | b. Let water flush line 108A for approximately 10 seconds

6. LIME SUCTION LINE: 108B a. Make sure valves are set as follows as in Table 4 and FIG. 5:

TABLE 4

| VALVE # | Open | Closed |
|---|---|---|
| SV-1 | | X |
| SV-2 | X | |
| LFV-1 | | X |
| LFV-2 | | X |
| LFV-3 | X | |
| LFV-4 | | X |
| WFV-1 | | X |
| WFV-2 | X | |
| WFV-3 | | X | b. Let water run for 5 seconds and shut off.

7. FLUSH LIME PUMP 109 as in Table 5 and FIG. 6:

TABLE 5

| VALVE # | Open | Closed |
|---|---|---|
| SV-1 | | X |
| SV-2 | X | |
| LFV-1 | X | |
| LFV-2 | | X |
| LFV-3 | X | |
| LFV-4 | | X |
| WFV-1 | X | |
| WFV-2 | X | |
| WFV-3 | | X | b. Run pump 109 for one (1) minute.

Table 6 shows the components for the circuits of FIGS. 8 to 21. These circuits are operated by the panel 200 of FIG. 7. FIGS. 22 to 34 show the logic of the circuit.

TABLE 6

| SYMBOL | QTY. | MANUTACTURER | PART NUMBER | DESCRIPTION |
|---|---|---|---|---|
| 1 | 1 | CUSTOM | CUSTOM | 48" × 37" × 12" NEMA 12 ENCLOSURE |
| 2 | 1 | CUSTOM | CUSTOM | 45" × 33" SUBPLATE |
| 3 | 1 | C-H | AN16CNOAB | NEMA SIZE 2 MOTOR STARTER |
| 4 | 1 | C-H | AN16DNOAB | NEMA SIZE 1 MOTOR STARTER |
| 5 | 2 | C-H | AN16BNOAC | NEMA SIZE 0 MOTOR STARTER |
| 6 | 1 | C-H | H20118-3 | HEATER PACK |
| 7 | 1 | C-H | H20098-3 | HEATER PACK |
| 6 | 1 | C-H | H20068-3 | HEATER PACK |
| 9 | 1 | C-H | H20138-3 | HEATER PACK |
| 10 | 3 | GOULD | TRS40R | 40 AMP 600 V CLASS RK5 FUSE |
| 11 | 3 | GOULD | TRS20R | 20 AMP 600 V CLASS RK5 FUSE |
| 12 | 3 | GOULD | TRS8R | 8 AMP 600 V CLASS RK5 FUSE |
| 13 | 3 | GOULD | TRS4R | 4 AMP 600 V CLASS RK5 FUSE |

TABLE 6-continued

| SYMBOL | QTY. | MANUFACTURER | PART NUMBER | DESCRIPTION |
|---|---|---|---|---|
| 14 | 3 | GOULD | ATO810 | 10 AMP CLASS CC FUSE |
| 15 | 1 | GOULD | ATO20 | 20 AMP CLASS CC FUSE |
| 16 | 9 | GOULD | ATO3 | 3 AMP MIDGET FUSE |
| 17 | 1 | GOULD | 67563 | POWER DISTRIBUTION BLOCK |
| 18 | 3 | GOULD | 08570 | POWER DISTRIBUTION BLOCK COVER |
| 19 | 3 | GOULD | AJT60 | 60 AMP MAIN DISC. FUSE |
| 20 | 4 | GOULD | 20308R | 3 POLE CLASS R FUSE BLOCK |
| 21 | 1 | GOULD | 30314R | 4 POLE CLASS CC FUSE BLOCK |
| 22 | 1 | C-H | C361S0162 | 60 AMP FUSIBLE DISCONNECT |
| 23 | 1 | C-H | S48G11SO2N | 2 KVA TRANSFORMER |
| 24 | 14 | C-H | E22XG1VV | 3 POS. SS |
| 25 | 13 | C-H | E22T2X20 | RED P-T PLOT LIGHT |
| 26 | 5 | C-H | E22T3X20 | GREEN P-T PILOT LIGHT |
| 27 | 2 | C-H | E22P1A | P-B (N.O.) |
| 28 | 1 | C-H | E22P1B | P-B (N.C.) |
| 29 | 19 | C-H | MR29120AC | CONTROL RELAY |
| 30 | 19 | C-H | OTO8-PC | RELAY SOCKET |
| 31 | 1 | C-H | D300RAK07B | PLC CHASSIS |
| 32 | 1 | C-H | D300PSU115 | PLC POWER SUPPLY |
| 33 | 1 | C-H | D300CPU300 | PLC PROCESSOR |
| 34 | 2 | C-H | D300DIM615A | 16 PT. INPUT MODULE |
| 35 | 1 | C-H | D300OOM1600R | 16 PT. OUTPUT MODULE |
| 36 | 1 | C-H | D300AMI420 | 4 CH. ANALOG INPUT MODULE |
| 37 | 4 | MILTRONICS | MINI-RANGER | LEVEL SENSOR AND TRANSMITTER |
| 38 | 4 | RED LION | PAXP | LEVEL INDICATORS |
| 39 | 1 | INGRAM | LRX-40 | EXTERNAL ALARM LIGHT |
| 40 | 1 | EDWARDS | 870P-N5 | ALARM HORN |
| 41 | 82 | A-B | 1492-CA1 | 55 AMP. 600 V-TERMINALS |
| 42 | 2 | A-B | 1492-N23 | END ANCHORS |
| 43 | 1 | A-B | 1492-NI | TERMINAL TRACK |
| 44 | 9 | A-B | 1492-CE6 | FUSE TERMINALS |
| 45 | 9 | A-B | 1492-N12 | FUSE PULLER |
| 46 | 1-LOT | CUSTOM | CUSTOM | RING TAGS |
| 47 | 1-LOT | CUSTOM | CUSTOM | TRACK TAGS |
| 48 | 1-LOT | CUSTOM | CUSTOM | TOOL TAGS |
| 49 | 1-LOT | TAYLOR | 92031 | 2" × 3" WIRE DUCT |
| 50 | 1-LOT | TAYLOR | 99020 | 2" DUCT COVER |
| 51 | 1 | CUSTOM | CUSTOM | 2" × 6" ASI NAME PLATE |
| 52 | 1 | P&S | CR15-1 | DUPLEX |
| 53 | 1 | RACO | 660 | DUPLEX BOX |
| 54 | 1 | RACO | 864 | DUPLEX COVER |
| 55 | 1 | ILSCO | CP4 | GROUND LUG |
| 56 | 1-LOT | | | RELAY TRACK |

*FIELD MOUNTED

The components and companies are listed below:
Tank 102, 106 and 110—Portland, Mich.
Feed line Pump 101 and 101A—Springfield, Ohio
Positive displacement pump 109—Springfield, Ohio
Day tanks 110, 110A and 110B—Portland, Mich.
Mixers 103, 107, 111, 111A and 111B—Rochester, N.Y.
Sensor 153—Houston, Tex.
Panel 200—Livonia, Mich.

It is intended that the foregoing description be only illustrative of the present invention and that the present invention be limited only by the hereinafter appended claims.

I claim:

1. An apparatus for introducing a mixed liquid base in a first container into a biological sludge in a second container in fluid connection with the first container which comprises:
    (a) a first conduit which extends into a bottom portion of the first container for removing the liquid base from the first container;
    (b) electrically operated pump means connected to the first conduit for pumping the liquid base from the first container;
    (c) a second conduit connected to the first conduit through the pump for introducing the liquid base and sludge into the second container;
    (d) a water line connected to the first and second conduits for intermittently flushing the first and second conduits and the pump;
    (e) electrically operated valve means in the first conduit and second conduit and water line for allowing the liquid base to flow from the first container to the second container and alternately to allow flushing of the first and second conduits and pump by the water line to remove retained amounts of the liquid base; and
    (f) electric control circuit means for controlling the electrically operated valve means and pump means.

2. The apparatus of claim 1 wherein a third conduit with an electric valve means is provided connected to the first conduit for adding the liquid base separately into the second container and wherein the water line is connected to the third conduit through an electric valve means for selectively flushing the third conduit.

3. An apparatus for introducing a mixed liquid base in a first closed container into a biological sludge in a second closed container in fluid connection with the first container to achieve a pH of 12 or above in the sludge for two (2) hours or more which comprises:
    (a) a first conduit which extends into a bottom portion of the first closed container for removing the liquid base from the first container;

(b) electrically operated pump means connected to the first conduit for pumping the liquid base from the first container;

(c) a second conduit connected to the first conduit through the pump for introducing the liquid base separately into the second container;

(d) a third conduit connected to the second conduit for conveying the liquid base into a fourth conduit containing the sludge which is mixed with the liquid base and then fed into the second container;

(e) water line for selectively providing water to each of the second conduit for flushing the second, third and fourth conduits and the pump respectively;

(f) electrically operated valve means in the first, second, third, fourth, conduits and water line; and (g) electric control circuit means connected to the valve means and pump means, wherein the valve means allow pumping of the liquid base by the pump means from the first container through the first, second, third and fourth conduits directly into the second container to be mixed with the sludge and allow selective intermittent flushing of the first, second, third and fourth conduits with water to prevent caking of retained amounts of the base in the first to fourth conduits.

4. A lime injector apparatus for introducing a mixed liquid lime from a first container into a biological sludge in a second closed container in fluid connection with the first container to provide a pH of 12 or above in the sludge which comprises:

(a) a first closed container for holding the liquid lime prior to introduction into the sludge for two (2) hours or more in the second closed container;

(b) a first conduit for removal of liquid lime from the first closed container;

(c) an electrically operated progressive cavity pump connected to the first conduit outside of the first closed container for pumping the liquid lime into the second closed container;

(d) electrically operated first valve means in the first conduit for directing the liquid lime through the pump;

(e) electrically operated second valve means in a second conduit leading to the second closed container from the first conduit;

(f) minimum and maximum level sensing means in the first closed container;

(g) a water line leading to the first and second conduits for introducing the water into the first and second conduits and pump to intermittently flush retained amounts of the liquid lime; and (h) electric control circuit means for remotely selectively operating the pump, the first valve and the second valve, wherein the liquid level in the first container is periodically at between the maximum level in the first container and refilled at the minimum level and wherein periodically the liquid lime is introduced into the second container.

5. The lime injector of claim 4 wherein the control means includes a sensor means in the second tank which activates a mixer when a level of the biological sludge and lime is above an impeller on the mixer so that the impeller is in the liquid lime and biological sludge.

6. The apparatus of claim 4 wherein a pH indicator means connected to the control means is provided in the second container, which indicator means measures the pH of the biological sludge containing the liquid lime initially upon introduction into the second container and, if above pH 12, automatically holds the sludge with mixing for 2 hours and then transfers the thus held biological sludge to a storage tank.

* * * * *